US008584174B1

(12) United States Patent
Fyock et al.

(10) Patent No.: US 8,584,174 B1
(45) Date of Patent: Nov. 12, 2013

(54) SYSTEMS AND METHODS FOR FANTASY LEAGUE SERVICE VIA TELEVISION

(75) Inventors: Christina Lynn Fyock, Sudbury, MA (US); Joel S. Angiolillo, Weston, MA (US); David A. Philbin, Arlington, MA (US); Michael R. Flynn, Norwood, MA (US); Maitreyi Krishnaswamy, New York, NY (US); Brian McDonald, Norwood, MA (US)

(73) Assignees: Verizon Services Corp., Ashburn, VA (US); Verizon Laboratories Inc., Waltham, MA (US); Verizon Services Organization Inc., Irving, TX (US)

( * ) Notice: Subject to any disclaimer, the term of this patent is extended or adjusted under 35 U.S.C. 154(b) by 810 days.

(21) Appl. No.: 11/356,052

(22) Filed: Feb. 17, 2006

(51) Int. Cl.
*G06F 3/00* (2006.01)
*G06F 13/00* (2006.01)
*H04N 5/445* (2011.01)

(52) U.S. Cl.
USPC ............. 725/61; 725/9; 725/10; 725/60

(58) Field of Classification Search
USPC ............................ 725/60, 9, 10, 61
See application file for complete search history.

(56) References Cited

U.S. PATENT DOCUMENTS

| | | | | |
|---|---|---|---|---|
| 4,918,603 A * | 4/1990 | Hughes et al. | | 463/4 |
| 5,018,736 A * | 5/1991 | Pearson et al. | | 463/29 |
| 5,155,591 A | 10/1992 | Wachob | | |
| 5,846,132 A * | 12/1998 | Junkin | | 463/42 |
| 5,860,862 A * | 1/1999 | Junkin | | 463/40 |
| 5,945,987 A | 8/1999 | Dunn | | |
| 5,971,854 A * | 10/1999 | Pearson et al. | | 463/41 |
| 6,009,355 A | 12/1999 | Obradovich et al. | | |
| 6,081,830 A | 6/2000 | Schindler | | |
| 6,165,071 A * | 12/2000 | Weiss | | 463/24 |
| 6,193,610 B1 * | 2/2001 | Junkin | | 463/40 |
| 6,280,323 B1 * | 8/2001 | Yamazaki et al. | | 463/4 |
| 6,324,694 B1 | 11/2001 | Watts et al. | | |
| 6,371,855 B1 * | 4/2002 | Gavriloff | | 463/42 |

(Continued)

FOREIGN PATENT DOCUMENTS

| | | |
|---|---|---|
| CN | 1517930 | 8/2004 |
| EP | 1489800 | 12/2004 |

(Continued)

OTHER PUBLICATIONS

PCT International Search Report and Written Opinion in PCT Application No. PCT/US07/03910, Filed Dec. 12, 2007.

(Continued)

*Primary Examiner* — Pankaj Kumar
*Assistant Examiner* — Charles N Hicks

(57) ABSTRACT

Systems and methods according to preferred embodiments enable a subscriber to participate in fantasy league competitions with other subscribers of the service, and to view other broadcasts simultaneously with fantasy league data on one or more televisions. A service provider enables the creation of a fantasy league related to real activities. One or more teams are associated with the fantasy league and players are then assigned to each of the created teams. In one embodiment, the teams are configured via a television interface and a remote control. Fantasy league data is tracked for each team based on participation of the team's assigned players in the real activities. Television broadcasts are then displayed simultaneously with fantasy league data on the television, a service that is not possible or practical in conventional television systems.

20 Claims, 18 Drawing Sheets

(56) References Cited

U.S. PATENT DOCUMENTS

| | | |
|---|---|---|
| 6,442,598 B1 | 8/2002 | Wright et al. |
| 6,565,084 B1* | 5/2003 | Katz et al. ............... 273/138.1 |
| 6,669,565 B2* | 12/2003 | Liegey ............................ 463/42 |
| 6,688,978 B1* | 2/2004 | Herman .......................... 463/25 |
| 6,733,383 B2* | 5/2004 | Busse et al. ...................... 463/6 |
| 6,749,198 B2* | 6/2004 | Katz et al. ............... 273/138.1 |
| 6,760,595 B2* | 7/2004 | Inselberg ...................... 455/517 |
| 6,773,350 B2* | 8/2004 | Yoshimi et al. ................ 463/42 |
| 6,774,926 B1 | 8/2004 | Ellis et al. |
| RE38,600 E | 9/2004 | Mankovitz |
| 6,811,484 B2* | 11/2004 | Katz et al. ..................... 463/17 |
| 7,001,279 B1* | 2/2006 | Barber et al. .................. 463/42 |
| 7,006,616 B1 | 2/2006 | Christofferson et al. |
| 7,120,871 B1* | 10/2006 | Harrington ................... 715/205 |
| 7,123,930 B2* | 10/2006 | Inselberg ...................... 455/517 |
| 7,159,235 B2 | 1/2007 | Son et al. |
| 7,178,158 B2 | 2/2007 | Nishina et al. |
| 7,243,139 B2* | 7/2007 | Ullman et al. ................ 709/219 |
| 7,294,776 B2 | 11/2007 | Tohgi et al. |
| 7,346,556 B2* | 3/2008 | Upendran et al. ......... 705/26.41 |
| 7,409,437 B2* | 8/2008 | Ullman et al. ................ 709/219 |
| 7,631,327 B2 | 12/2009 | Dempski et al. |
| 7,669,219 B2 | 2/2010 | Scott, III |
| 2002/0059621 A1 | 5/2002 | Thomas et al. |
| 2002/0089610 A1 | 7/2002 | Ohno et al. |
| 2002/0138843 A1 | 9/2002 | Samaan et al. |
| 2002/0142842 A1* | 10/2002 | Easley et al. .................. 463/42 |
| 2002/0144273 A1 | 10/2002 | Reto |
| 2002/0157099 A1* | 10/2002 | Schrader et al. ................ 725/51 |
| 2002/0157101 A1* | 10/2002 | Schrader et al. ................ 725/64 |
| 2002/0166123 A1* | 11/2002 | Schrader et al. ................ 725/58 |
| 2003/0002849 A1 | 1/2003 | Lord |
| 2003/0005446 A1 | 1/2003 | Jaff et al. |
| 2003/0028892 A1 | 2/2003 | Gewickey et al. |
| 2003/0172375 A1* | 9/2003 | Shaw et al. ......................... 725/9 |
| 2003/0182663 A1 | 9/2003 | Gudorf et al. |
| 2003/0191816 A1 | 10/2003 | Landress et al. |
| 2003/0229900 A1* | 12/2003 | Reisman ......................... 725/87 |
| 2004/0017396 A1 | 1/2004 | Werndorfer et al. |
| 2004/0019912 A1 | 1/2004 | Staack |
| 2004/0031058 A1* | 2/2004 | Reisman ....................... 725/112 |
| 2004/0117852 A1 | 6/2004 | Karaoguz et al. |
| 2004/0139233 A1 | 7/2004 | Kellerman et al. |
| 2004/0159215 A1 | 8/2004 | Tohgi et al. |
| 2004/0168187 A1 | 8/2004 | Chang |
| 2004/0194137 A1 | 9/2004 | Shreesha |
| 2004/0198495 A1* | 10/2004 | Cisneros et al. ................ 463/42 |
| 2004/0231003 A1 | 11/2004 | Cooper et al. |
| 2004/0261106 A1* | 12/2004 | Hoffman ......................... 725/43 |
| 2005/0028208 A1 | 2/2005 | Ellis et al. |
| 2005/0066362 A1 | 3/2005 | Rambo |
| 2005/0066364 A1 | 3/2005 | Rambo |
| 2005/0076362 A1* | 4/2005 | Dukes et al. .................... 725/46 |
| 2005/0086358 A1 | 4/2005 | Rosenberg |
| 2005/0091694 A1 | 4/2005 | Rambo |
| 2005/0108767 A1 | 5/2005 | Ma |
| 2005/0246457 A1 | 11/2005 | Parry et al. |
| 2005/0246757 A1 | 11/2005 | Relan et al. |
| 2005/0262542 A1 | 11/2005 | DeWeese et al. |
| 2006/0015745 A1 | 1/2006 | Sukigara et al. |
| 2006/0039361 A1 | 2/2006 | Ohno et al. |
| 2006/0123455 A1 | 6/2006 | Pai et al. |
| 2006/0137015 A1 | 6/2006 | Fahrny et al. |
| 2006/0183547 A1* | 8/2006 | McMonigle ................... 463/40 |
| 2007/0028287 A1 | 2/2007 | Yamamoto et al. |
| 2007/0060380 A1* | 3/2007 | McMonigle et al. ........... 463/42 |
| 2007/0061837 A1 | 3/2007 | Dadush |
| 2007/0107019 A1 | 5/2007 | Romano et al. |
| 2007/0115845 A1 | 5/2007 | Hochwarth et al. |
| 2007/0124795 A1 | 5/2007 | McKissick et al. |
| 2007/0129123 A1* | 6/2007 | Eryou et al. ...................... 463/1 |
| 2007/0157281 A1 | 7/2007 | Ellis et al. |
| 2007/0198738 A1 | 8/2007 | Angiolillo et al. |
| 2007/0199018 A1 | 8/2007 | Angiolillo et al. |
| 2007/0199019 A1* | 8/2007 | Angiolillo et al. .............. 725/39 |
| 2007/0199025 A1 | 8/2007 | Angiolillo et al. |
| 2007/0204308 A1* | 8/2007 | Nicholas et al. ................ 725/86 |
| 2008/0140406 A1 | 6/2008 | Burazerovic et al. |
| 2008/0141303 A1 | 6/2008 | Walker et al. |
| 2011/0107220 A1* | 5/2011 | Perlman ........................ 715/720 |

FOREIGN PATENT DOCUMENTS

| | | |
|---|---|---|
| WO | 01/46818 | 6/2001 |
| WO | 02/19701 | 3/2002 |
| WO | WO-02/102079 | 12/2002 |
| WO | WO-2005/003899 | 1/2005 |
| WO | WO-2006/012788 | 2/2006 |
| WO | 2007/097965 | 8/2007 |

OTHER PUBLICATIONS

Michael, Bill and Jainschigg, John, "Instant Messaging," Call Center, Jan. 5, 2001, <http://www.cconvergence.com/GLOBAL/stg/commweb_shared/shared/article/showArticle.jhtml?articleId=8700996&pgno=1>, (4 pages).

"Instant Messaging and Presence," SIP Showcase, accessed Oct. 27, 2005, <http://www.sipcenter.com/sip.nsf/html/Instant+Messaging+and +Presence>, (2 pages).

Regan, Tim and Todd, Ian, "Media Center Buddies: Instant Messaging around a Media Center ," Technical Report MSR-TR-2004-47, Microsoft Research, Jun. 2, 2004, <http://research.microsoft.com/research/pubs/view.aspx?type=Technical%20Report&id=751> (9 pages).

"Comcast and Microsoft Announce Agreement to Trial Microsoft TV Software ," Microsoft TV Press Release, Jul. 21, 2003, <http://www.microsoft.com/tv/content/PressReleases/MSTVComcastPR.mspx> (2 pages).

"AINGR: Switch—Service Control Point(SCP)/Adjunct Interface," Telcordia Technologies Generic Requirements GR-1299-CORE, Issue 7, Nov. 2001, (542 pages).

"AINGR: Switching Systems," Telcordia Technologies Generic Requirements GR-1298-CORE, Issue 7, Nov. 2001, (2206 pages).

Handley, M., Schulzrinne, H., Schooler, E., and Rosenberg, J., "RFC 2543—SIP: Session Initiation Protocol," The Internet Society, Mar. 1999, (132 pages).

Rosenberg, J., "RFC 3656—A Presence Event Package for the Session Initiation Protocol (SIP)," The Internent Society, Aug. 2004, (25 pages).

Fujimoto, S., Sugano, H., Klyne, G., Bateman, A., Carr, W., and Peterson, J., "RFC 3863—Presence Information Data Format (PIDF)," The Internet Society, Aug. 2004, (31 pages).

Page from www.tivo.com/4.9.5.asp for Digital Photo Viewer Printed Aug. 16, 2005 (1 page).

Page from www.snapfish.com for Snapfish Printed Aug. 16, 2005 (1 page).

Page from www.ofoto.com for Kodak EasyShare Gallery Printed Aug. 16, 2005 (1 page).

Page from http://photos.yahoo.com for Yahoo! Photos Printed Aug. 16, 2005 (1 page).

"Microsoft TV Photo Viewer Provides a Simple Way to View Digital Photos on Home Television Sets." www.microsoft.com/presspass/features/2001/sep01/09-20tvphotoviewer.mspx Printed Aug. 16, 2005 (2 pages).

"Interactive TV stuck in zip?" Printed Aug. 25, 2005 from http://www.mediaweek.co.uk/articles/2004/7/20/InteractiveTVstuckinzip (4 pages).

"That Wonderful Honda Ad" Printed on Aug. 25. 2005 from http://battellemedia.com/archives/000137.php (6 pages).

"Welcome to the Honda Multimedia" Printed on Aug. 25, 2005 from http://www.honda.co.uk/multimedia/ (1 page).

"Honda Interactive TV Campaign to Explain New IMA Technology" Printed Aug. 25, 2005 from http://www.e-consultancy.com/about/press.asp?id=166 (3 pages).

"Zip TV Debuts With Interactive Content for Honda Campaign" Printed on Aug. 25, 2005 from http://www.alada.org/article.asp?id=20603 (2 pages).

(56) References Cited

OTHER PUBLICATIONS

"Interactive TV Advertising: Turning Viewers Into Direct Leads Without a Set-Top Box" (4 pages), Printed Aug. 25, 2005 from http://www.broadcastpapers.com/data/IKSInteractiveTV02.htm.
Tawani et al., "Context Aware Personalized Ad Insertion an Interactive TV Environment" (6 pages), Satyam Computer Services Limited. Printed Aug. 25, 2005 from http://www.di.unito.it/~liliana/TV04/FINAL/thawani.pdf.
"Wink Communications Launching Interactive TV Commercials" (4 pages). Printed Aug. 31, 2005 from www.clickz.com/news/article/pp/16761.
"ZIP TV Channel Launches with Exclusive Honda Video" (24 pages). Printed Aug. 31, 2005 from www.immediatefuture.co.uk/296.
"BBC, Channel 4 and ITV to Extend Audio Description Service," Jun. 21, 2004, http://www.bbc.co/uk/pressoffice/pressreleases/stories/2004/06_june21/audio.shtml, (2 pages).
"Audio Descriptions," Newsletter for Apr. 2004, <http://www.eabnet.org.uk/knowitall/finally/teabreak/newsletters/April/April2004.htm> (acessed Jul. 5, 2005), 4 pages).
"TV for the Blind—New Audio Description Tool Changes TV Experience," Netgem Press Release, Jan. 13, 2004, <http://www.netgemdirect.com/files/homepage/tvfortheblind>, (2 pages).
Netgem i-Player AD, <http://www.netgemdirect.com/default.asp?action=produit&id_prod=5> (accessed Jul. 6, 2005), (1 page).
"Five to Use BskyB's Audio Description Technology," British Sky Broadcasting Group Press Release, Nov. 18, 2003, <http://www1.sky.com/disability/release2.htm>, (2 pages).
"An Introduction to Screen Readers," Printed Jul. 19, 2007, from http://web.archive.org/web/20040404135336/http://mason.gmu.edu/~swidmaye/portfolio/edit797assistivetech.htm (5 pages).
Speir, Michelle, "Screen Readers Open Windows for the Blind," Printed Jul. 19, 2007, from http://www.fcw.com/fcw/articles/2000/0807/cov-access3-08-07-00.asp. (3 pages).
"Alternative Web Browsing," Printed Jul. 19, 2007, from http://www.w3.org/WAI/References/Browsing.hml. (4 pages).
"Fantasy Sports Trade Association" <http://www.fsta.org/index.shtml> (accessed Aug. 26, 2005).
Batts, Battino, "Sports Fans become CEOs in Multibillion-Dollar Fantasy Leagues," Virginian-Pilot, Knight Ridder/Tribune Business Review, Sep. 26, 2004.
"Fantasy Sports is our Undiscovered Game," Jul. 28, 2004, <http://www.electronicgamingbusiness.com>.
Tedeschi, Bob, "Advertisers Discover the Value of Young Men with Time and Money to Spend on Fantasy Sports on the Web," New York Times, Aug. 23, 2004, p. C7.
Kessler, Scott, "Hot Players in Online Gaming," Business Week Online, May 24, 2004, <http://www.businessweek.com/investor/content/may2004/pi20040524_2927_pi044.htm>.
Hurtt, Rob, "Get in the Game: Think You Know Football? Put it to Use. Fantasy Leagues Have Something to Offer Every Fan, Even Old-Schoolers," The Sporting News, Aug. 30, 2004.
Wendel, Tim, "How Fantasy Games Have Changed Fans," USA Today, <http://www.usatoday.com/news/opinion/editorials> (posted Sep. 19, 2004).
Delaney, Kevin, "Fantasy Sports Lures AOL, Electronic Arts as More Fans Join In", Wall Street Journal, Sep. 9, 2004, p. B1.
Arthur, Bruce, "It's Fantasy-astic: Fantasy Football has Become a Monster in North America, Which Explains My Sudden Interest in Guys Named Morten," National Post, Toronto Edition, Sep. 27, 2004, p. S2.
Levy, Paul, "The Teams Aren't Real, but Money Is: Fantasy Sports have Caught Corporations' Attention," Minneapolis Star Tribune, Aug. 29, 2004, p. 1A.
Hoffarth, Tom, "Fantasy Football is TV's Reality," The Daily News of Los Angeles, Sep. 10, 2004, p. S2.
Warley, Stephen, "Sports iTV: The Sporting News," Oct. 23, 2002, <http://www.tvspy.com/nexttv/nexttvcolumn.cfm?t_nexttv_id=581&page=1&t_content_cat_id=10>.
International Search Report and Written Opinion dated Jul. 28, 2008 issued for international application No. PCT/US07/03908, 11 pages.
International Search report and Written Opinion Dated Aug. 25, 2008 issued for interantional aplplication No. PCT/US07/03907, 14 pages.
International Search report and Written Opinion Dated Dec. 13, 2007 issued for interantional aplplication No. PCT/US07/03909, 11 pages.
Written Opinion Dated Aug. 25, 2008 issued for international application No. PCT/US07/03907, 5 pages.
Written Opinion Dated Dec. 13, 2007 issued for international application No. PCT/US07/03909, 4 pages.
U.S. Unpublished U.S. Appl. No. 11/356,090.
U.S. Unpublished U.S. Appl. No. 11/356,053.
Chorianopoulos, "Content-Eriched Communication—Supporting the Social Uses of TV", Chorianopoulos K: "Content-Enriched Communication—Supporting the Social Uses of TV", British Telecommunications Engineering, British Telecommunications Engineering. London, GB, vol. 6, No. 1, Jan. 1, 2007, pp. 23-29, XP001507678, ISSN: 02, Jan. 7, 2007.
Graefen, "Mit Samba Wird Aus Linux Ein Stabiler Windows Datei-Und Druckserver", Graefen R: "Mit Samba Wird Aus Linux Ein Stabiler Windows Datei-Und Druckserver", NTZ (Nachrichtentechnische Zeitschrift), VDE Verlag GmbH, DE, vol. 52, No. 6, Jan. 1, 1999, p. 32/33, XP000846989, ISSN: 0948-728X., Jan. 1, 19993
The American Heritage College Dictionary, fourth edition, Houghton Mifflin Company, 2002, p. 842.
Unpublished U.S. Appl. No. 11/356,052.
Unpublished U.S. Appl. No. 11/356,053.
Aingr: Switching Systems, Telcordia Technologies Generic Requirements GR-1298-CORE, Issue 7, Nov. 2001, (1130 pages). Part 2.

\* cited by examiner

SYSTEMS AND METHODS FOR FANTASY LEAGUE SERVICE VIA TELEVISION

I. RELATED APPLICATIONS

The applications listed below are related to this application and are being filed on the same date as this application:

U.S. patent application Ser. No. 11/356,090, entitled "Systems and Methods for Providing Supplementary Television Content";

U.S. patent application Ser. No. 11/356,053, entitled "Systems and Methods for Shared Viewing Via Television";

U.S. patent application Ser. No. 11/356,056, entitled "Television Integrated Chat and Presence Systems and Methods";

U.S. patent application Ser. No. 11/356,094, entitled "Systems and Methods for Providing a Personal Channel Via Television";

U.S. patent application Ser. No. 11/356,092, entitled "Systems and Methods for Providing a Shared Folder in an Interactive Program Guide (IPG) via Television"; and U.S. patent application Ser. No. 11/356,091, entitled "Systems and Methods for Voicing Text in an Interactive Programming Guide".

II. TECHNICAL FIELD

The present application is generally directed to communications networks having video transmission capabilities. The embodiments described herein are more specifically directed to systems and methods to receive and transmit enhanced television services over high bandwidth access networks, including fantasy league services.

III. BACKGROUND INFORMATION

Consumers and businesses today receive television services from a variety of sources. Using even the most basic television set, viewers can receive traditional television broadcasts via an antenna connected to the television set. The problems with traditional broadcast television are well known. To receive a television signal, the receiving antenna must be within the range of a broadcast transmitter, making it difficult to receive a signal in remote places. The quality of a broadcast picture can depend on the strength or position of the antenna, leading to fuzzy pictures and constant repositioning of the antenna. Furthermore, traditional broadcast television is limited to simple viewing. The television signal is received and a picture is displayed on the viewer's television. Aside from changing channels, there is no way for viewers to customize television content or to communicate with broadcasters.

Cable television and, later, satellite television were developed to solve some of the problems associated with traditional broadcast television. Cable television providers receive television content from a variety of programming sources and transmit the content via cables, such as coaxial cables, directly to subscribers' homes. In the home, a "set top box" is typically used to receive the cable signal and provide it to the televisions for display. Although cable television does not generally suffer from the picture quality problems of over-the-air broadcast television, the use of amplifiers to carry the cable signal over long distances can cause signal degradation and reliability problems. The typical cable set top box also offers limited options for customizing content because it relies on standard broadcast television content transmissions, has generally contained limited processing functionality and has limited network interactivity capabilities (e.g., pay-per-view requests, video on demand requests).

Satellite television provides a high quality television picture because its signal travels through the air (i.e., a faster and more accurate delivery medium than cable) and it does not rely on an antenna's range to the content provider. Instead, satellite providers broadcast television content to a geosynchronous satellite that rebroadcasts the content to a satellite dish at a subscriber's home. The satellite dish is typically connected to a satellite receiver that decrypts and formats the television content and delivers it to the televisions for display. However, satellite television is not without its limitations. For example, like cable television services, satellite television relies on standard broadcast content transmissions. Furthermore, satellite receivers rely on low-bandwidth conventional "plain old telephone service" (POTS) telephone lines to provide a bi-directional communication path for requests from the satellite receiver and download of customized content, so download rates are slow and available content is limited.

Digital video recorders, available as standalone components or integrated in set top boxes and satellite receivers, enable viewers to record television content. Using a menu displayed on the television, viewers may be able to select programs to be recorded, order pay-per-view content, and set viewing preferences, such as parental controls. However, typical digital video recorders use low-bandwidth POTS phone lines as a bi-directional communication path to a cable, satellite or other service provider, limiting the ability to provide any content customized specifically for a particular user.

Over the years, broadcast, cable, and satellite television have steadily improved television picture quality and some providers have developed the capacity to deliver limited enhancements to video broadcast viewing, such as pay-per-view and video-on-demand. Digital video recorders enable viewers to receive content in a limited and delayed fashion. However, there remains a need for enhanced television services that are rich, reliable, and truly customized.

IV. BRIEF DESCRIPTION OF THE DRAWINGS

Figure 3A:
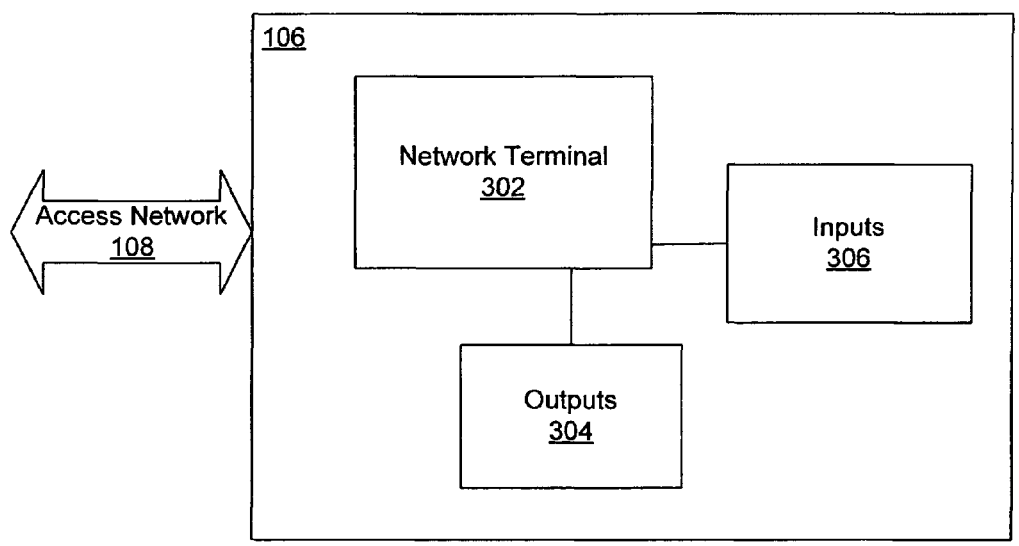
Figure 3B:
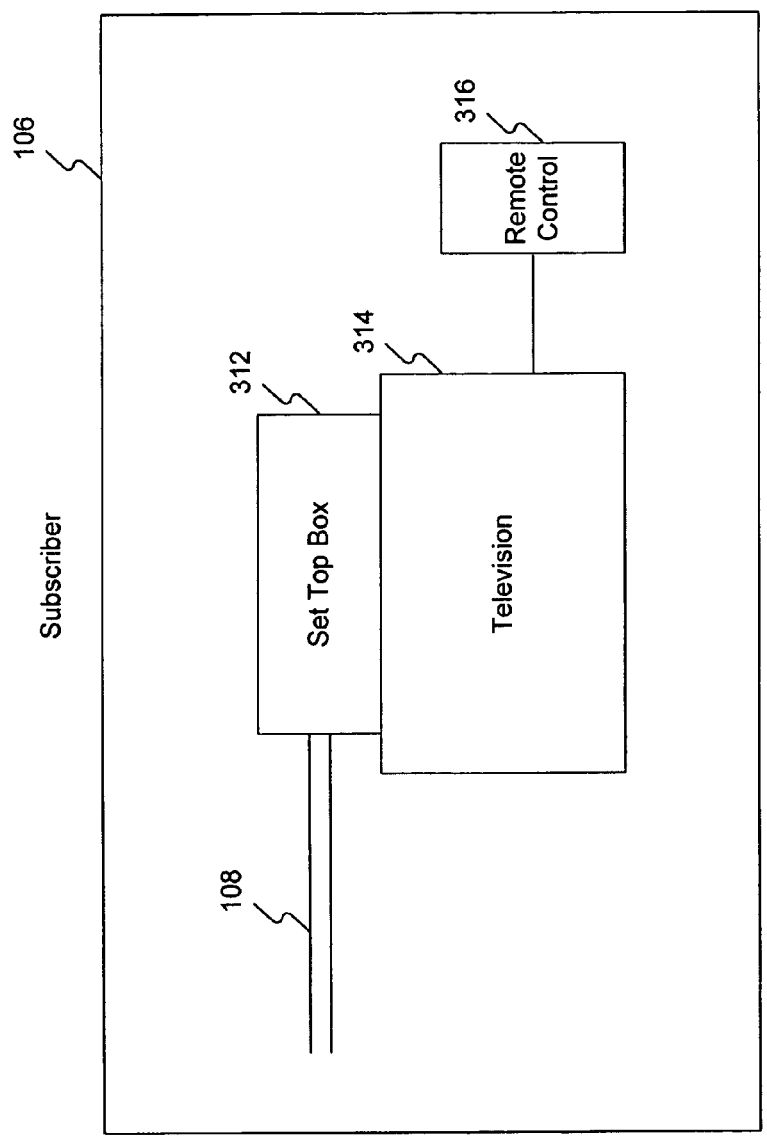

FIGS. 3(a) and 3(b) are detailed block diagrams of a subscriber consistent with an embodiment of the present invention.

Figure 4:
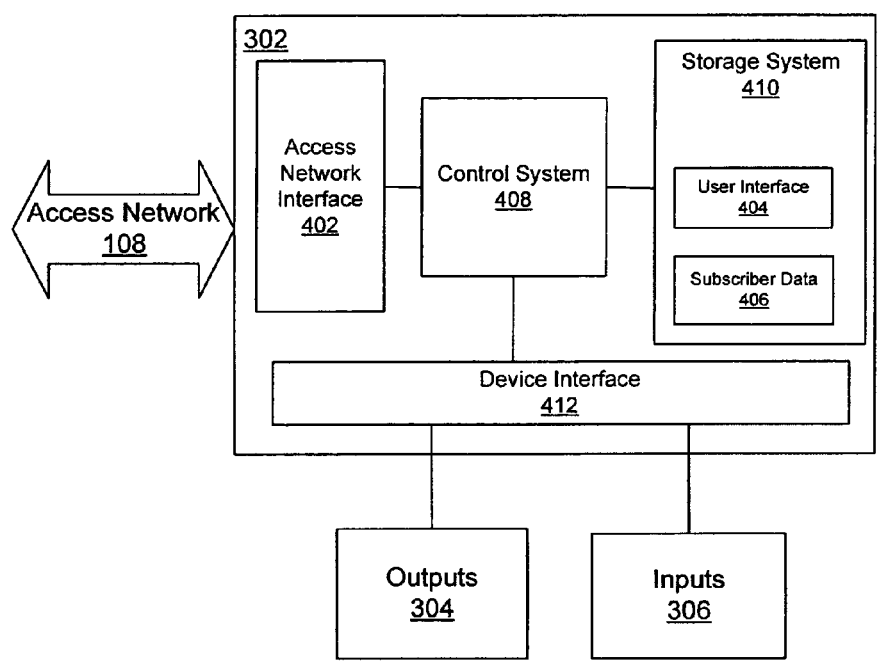

FIG. 4 is a detailed block diagram of network terminal consistent with an embodiment of the present invention.

Figure 5:
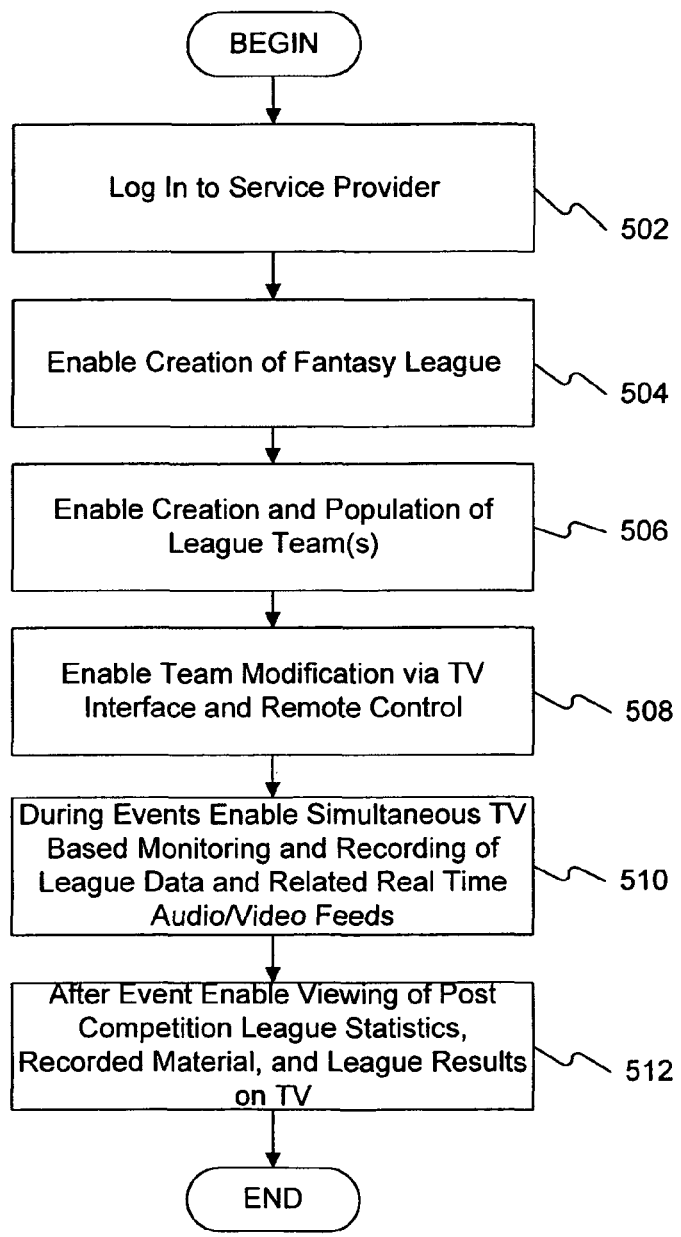

FIG. 5 is a flowchart depicting one implementation of a method for providing fantasy league services consistent with one embodiment of the present invention.

Figure 6:
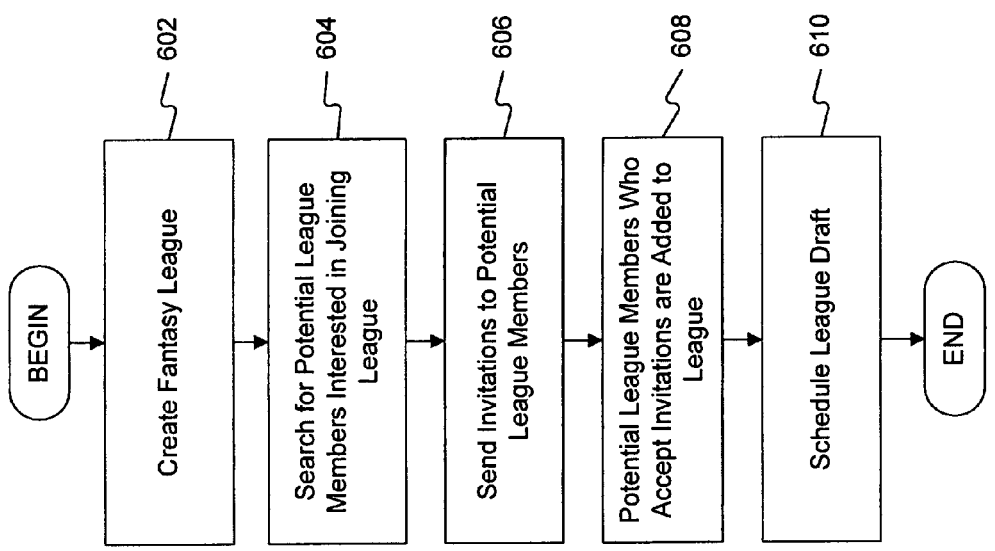

FIG. 6 is a flowchart demonstrating an exemplary method for enabling the creation, modification, and administration of a fantasy league, consistent with one embodiment of the present invention.

Figure 7:
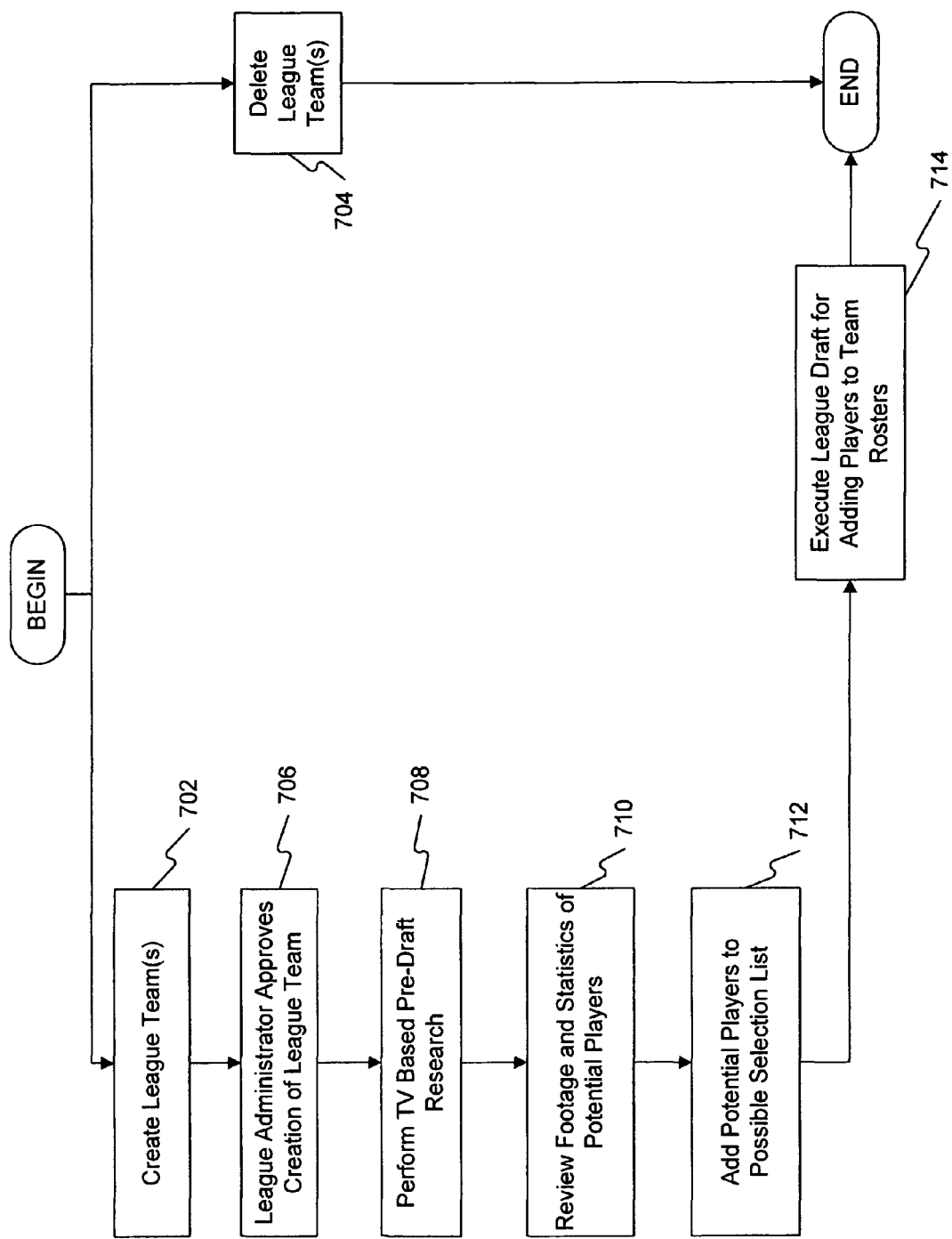

FIG. 7 is a flowchart of an exemplary method for creating, populating, and modifying a fantasy league team consistent with one embodiment of the present invention.

Figure 8:
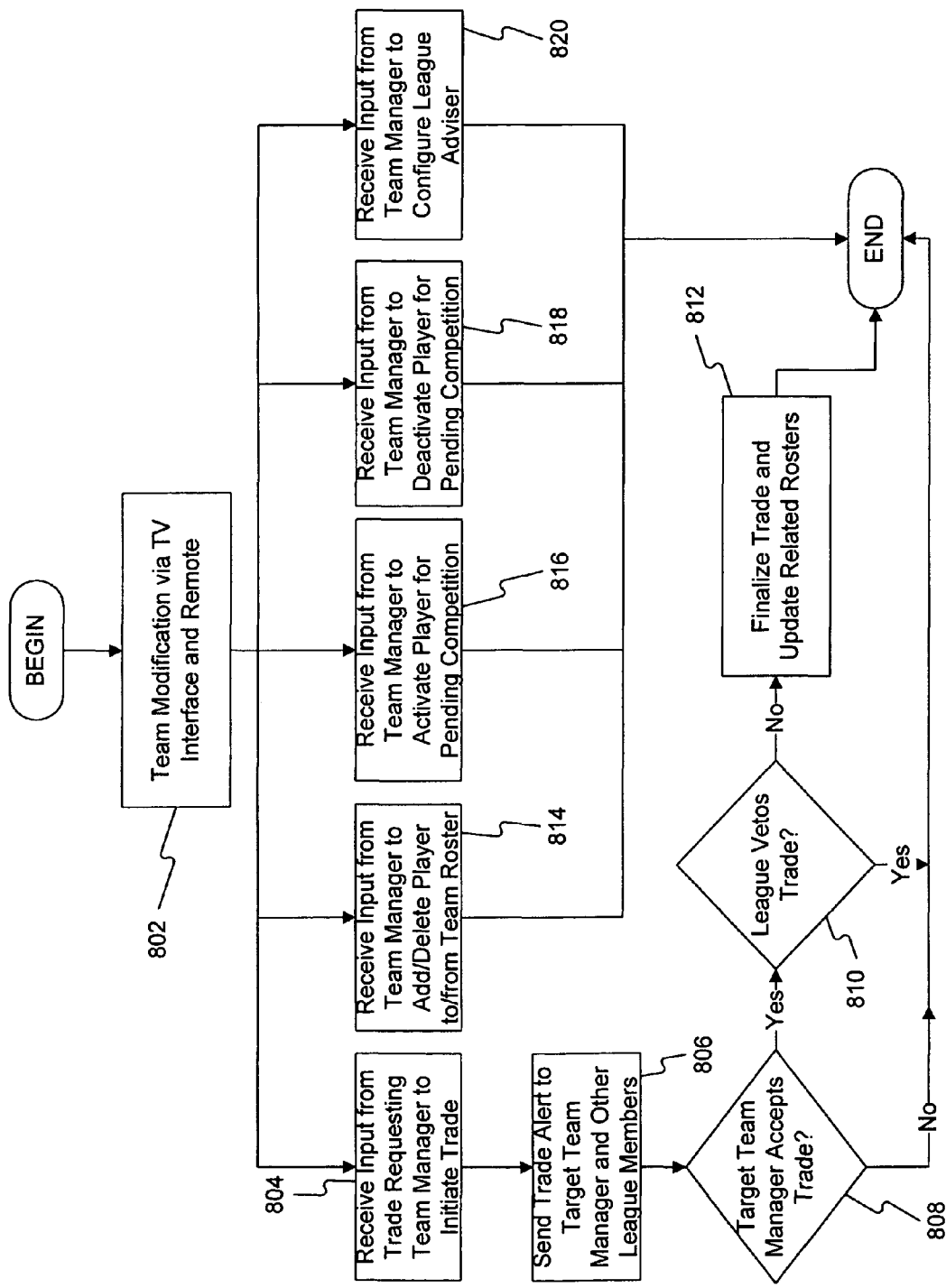

FIG. 8 is a flowchart showing an exemplary method for processing requests related to team modifications, consistent with one embodiment of the present invention.

Figure 9:
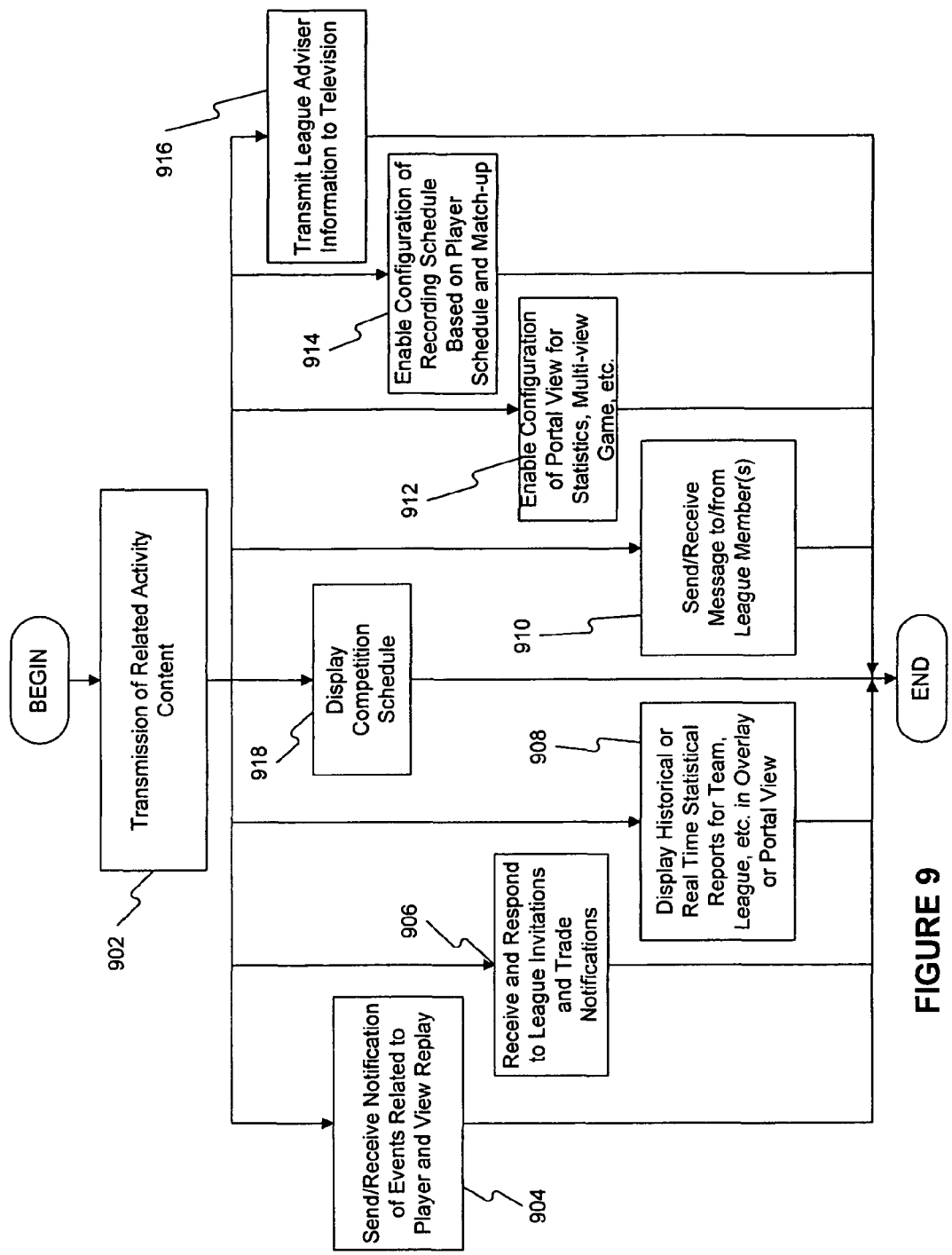

FIG. 9 is a flowchart depicting an example of server processing performed in response to user actions while monitoring real activities, other broadcasts, and league performance data, consistent with one embodiment of the present invention.

Figure 10:
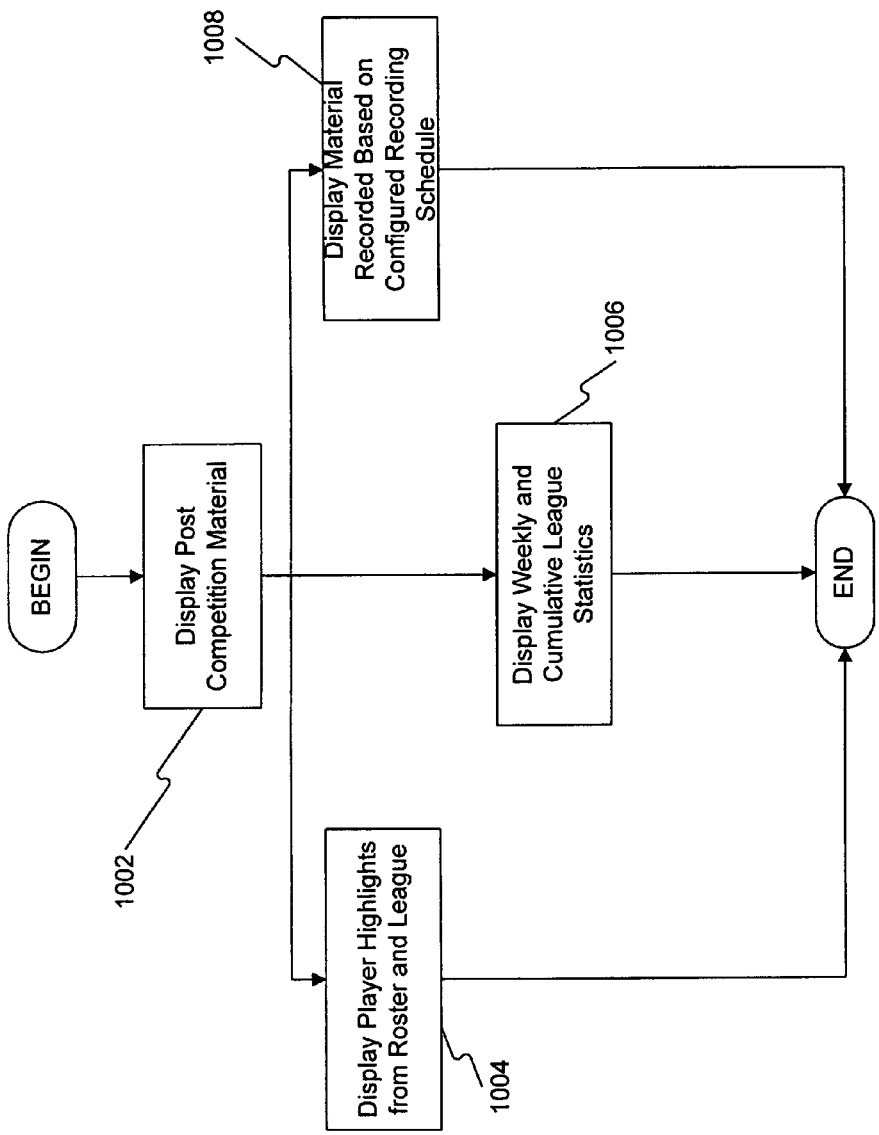

FIG. 10 is a flowchart showing an exemplary method for processing related to post activity time period actions taken by a league member consistent with one embodiment of the present invention.

Figure 11:
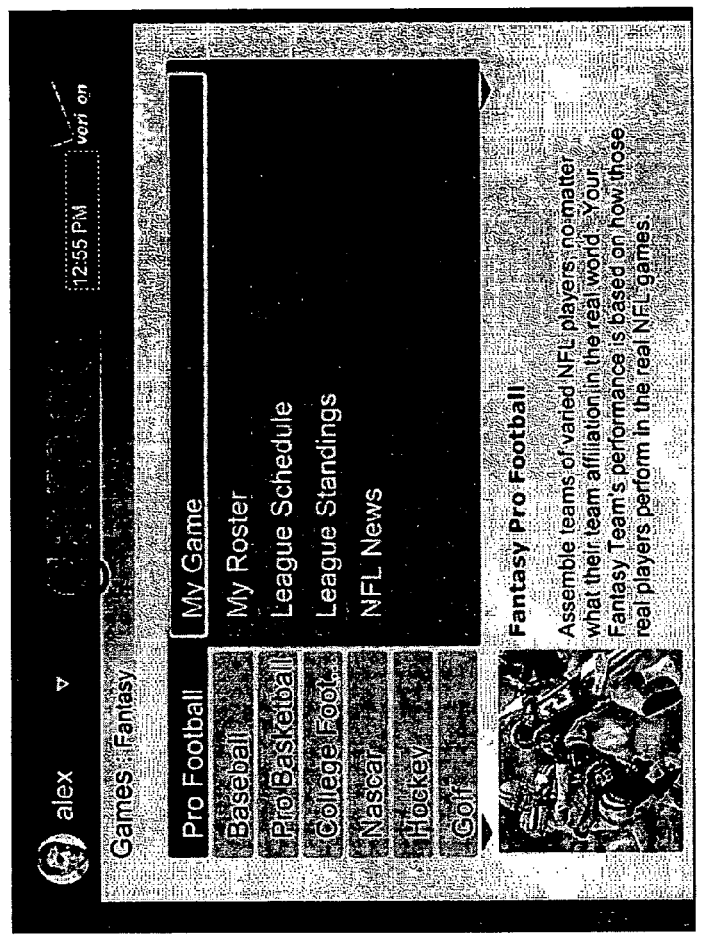

FIG. 11 shows one example of an interface that may be used for accessing the functionality available within fantasy league services consistent with one embodiment of the present invention.

Figure 12:
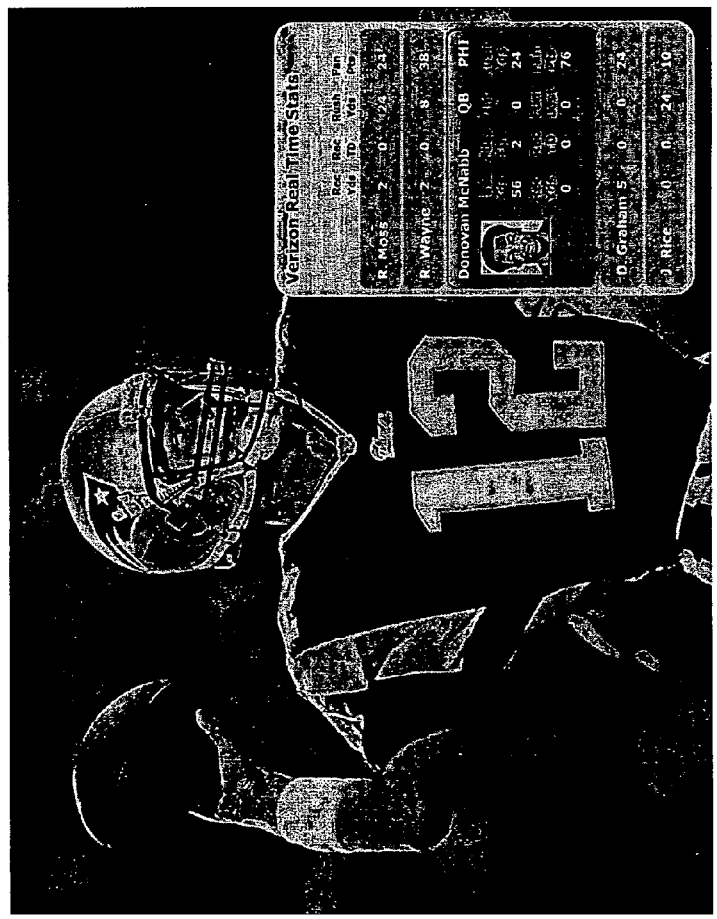

FIG. 12 depicts one example of a display configuration, demonstrating a television broadcast monitored simultaneously with fantasy league data, consistent with one embodiment of the present invention.

Figure 13:
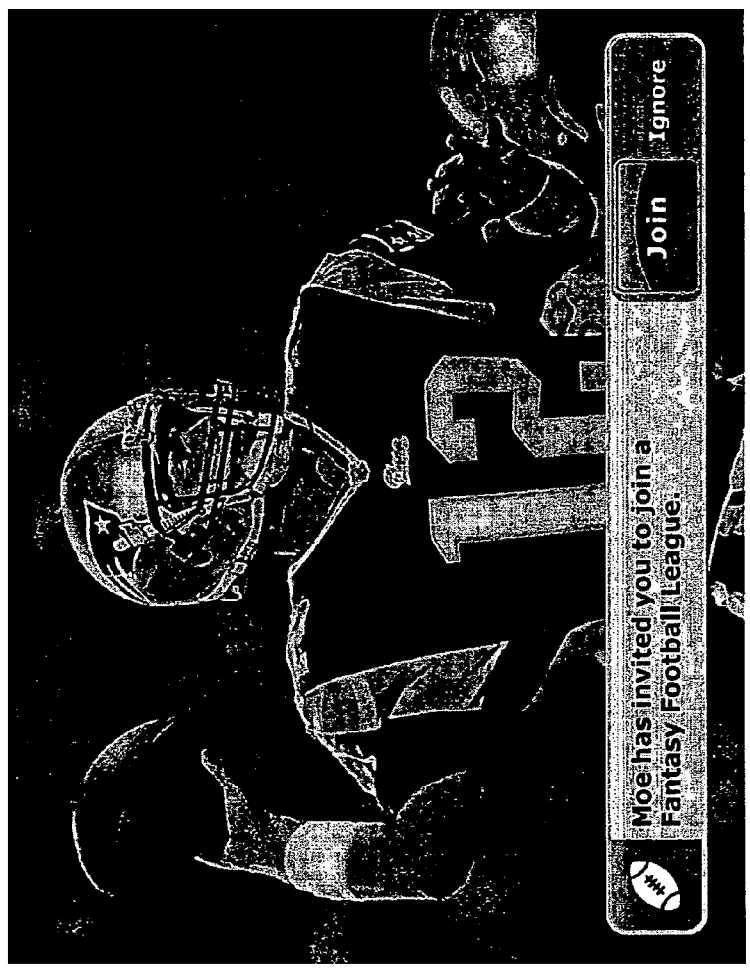

FIG. 13 shows one example of displaying an invitation to join a fantasy league on an invitee's television consistent with one embodiment of the present invention.

Figure 14:
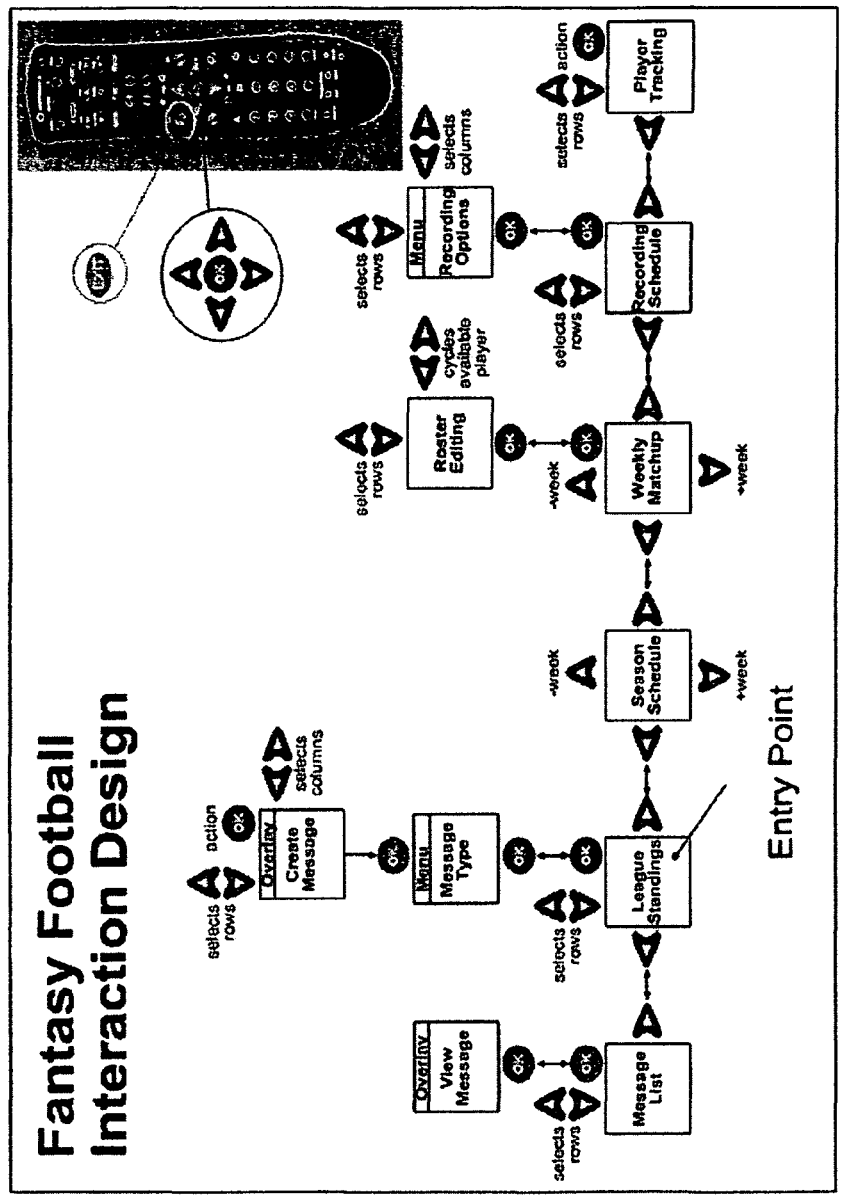

FIG. 14 shows one arrangement of remote control buttons that a team manager may use to access fantasy services consistent with one embodiment of the present invention.

Figure 15:
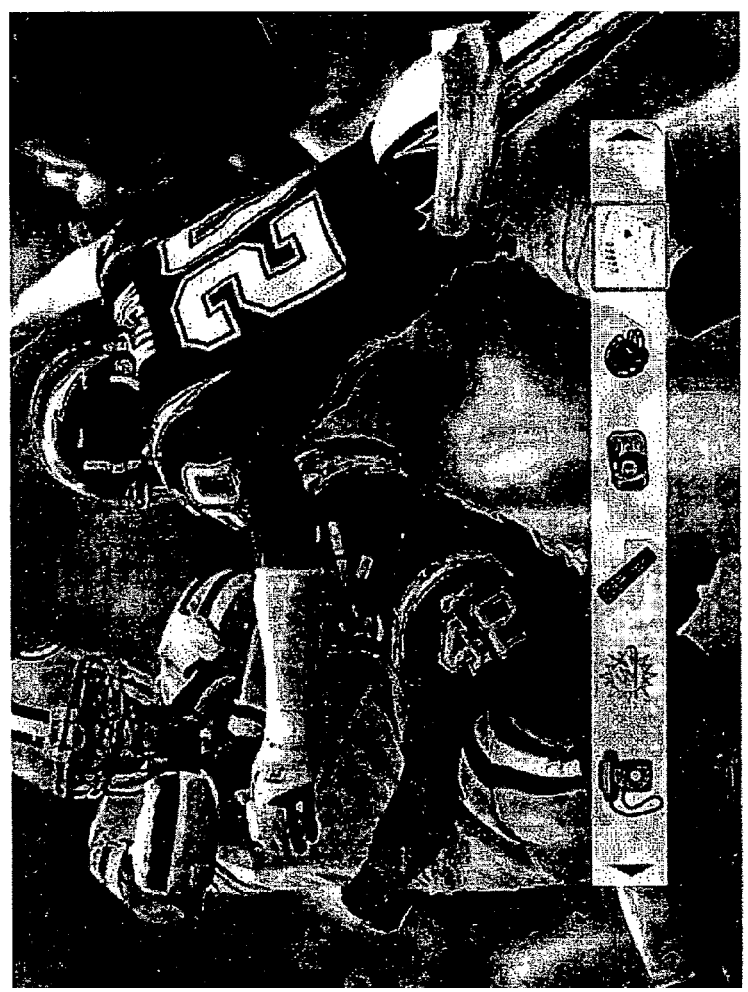

FIG. 15 shows one example of an interface for accessing fantasy league services consistent with one embodiment of the present invention.

Figure 16:
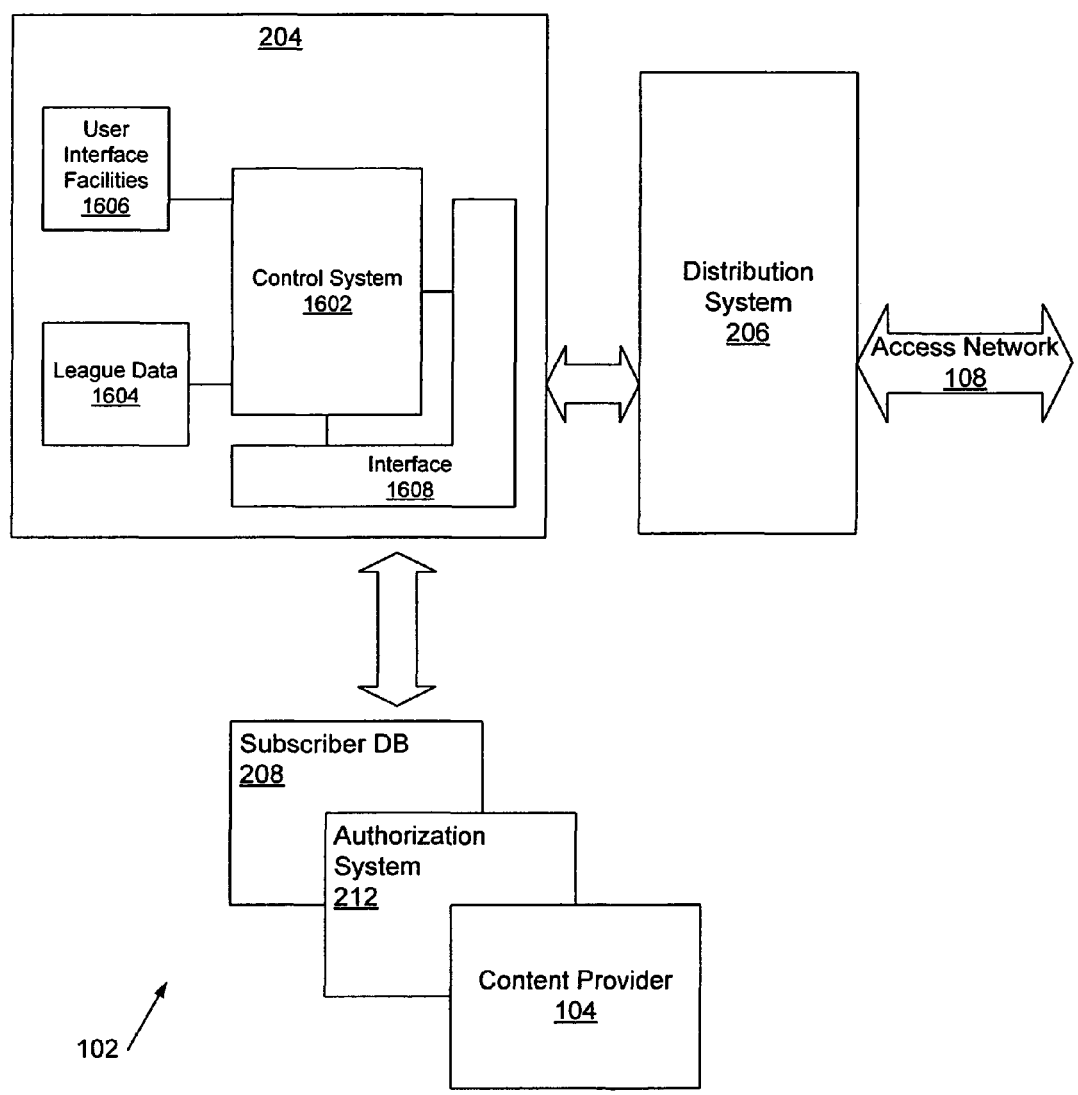

FIG. 16 shows a detailed block diagram of an enhanced television services system implementing a fantasy league service, consistent with one embodiment of the present invention.

Figure 17:
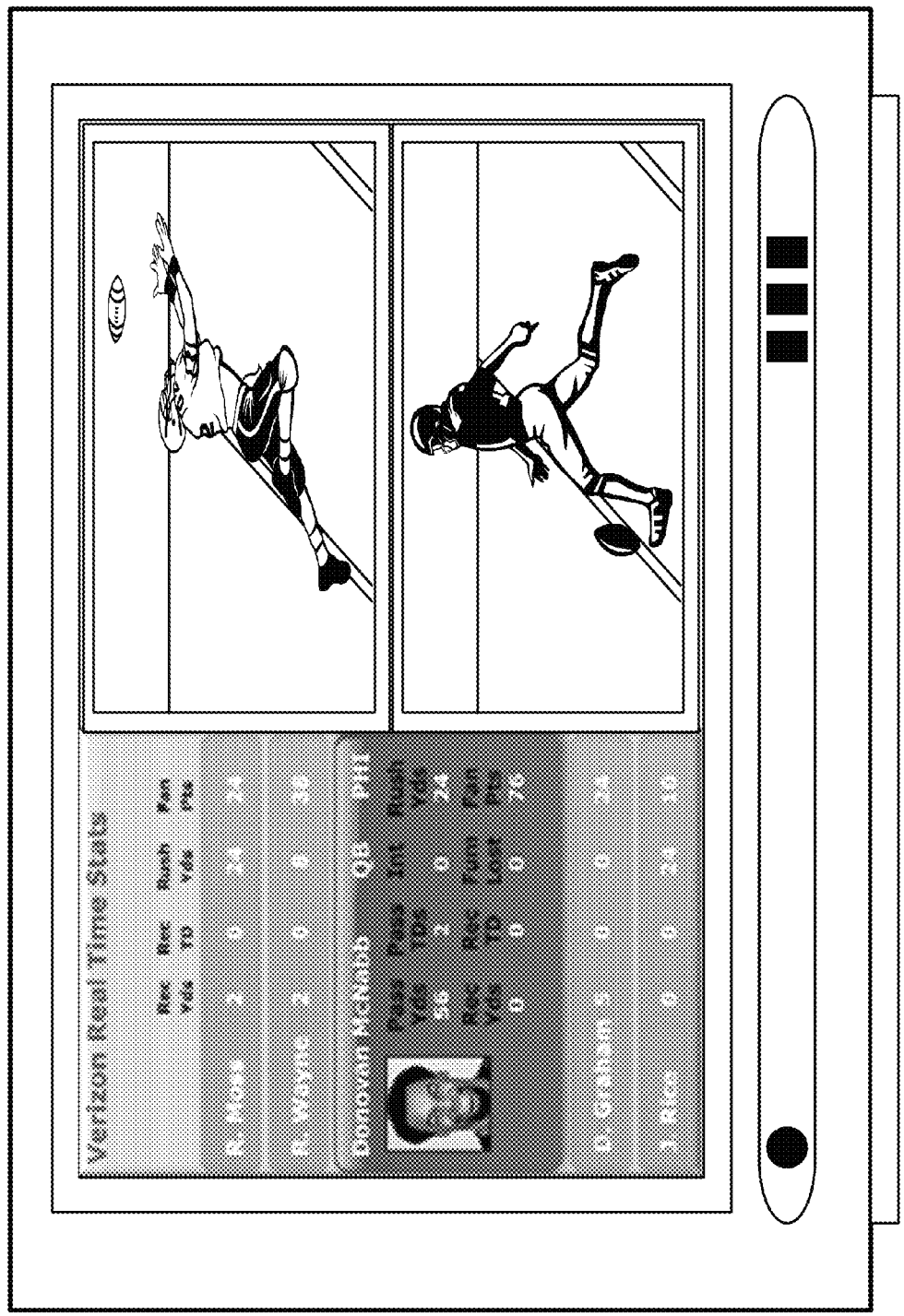

FIG. 17 depicts an example of a display configuration, demonstrating multiple television broadcasts being simultaneously provided with fantasy league data.

V. DETAILED DESCRIPTION OF PREFERRED EMBODIMENTS

Preferred methods and systems consistent with the present invention provide enhanced television services to subscribers using a high speed bi-directional connection such as a fiber optic network. A service provider transmits both general television content, such as broadcast television programs, and content that is customized for each subscriber. Subscribers communicate with the service provider to perform any number of tasks, including establishing an account, ordering customized content, and sharing content with other subscribers.

Reference will now be made in detail to various exemplary embodiments of the invention, examples of which are illustrated in the accompanying drawings. Wherever possible, the same reference numbers will be used throughout the drawings to refer to the same or like parts.

A. System Overview

Figure 1:
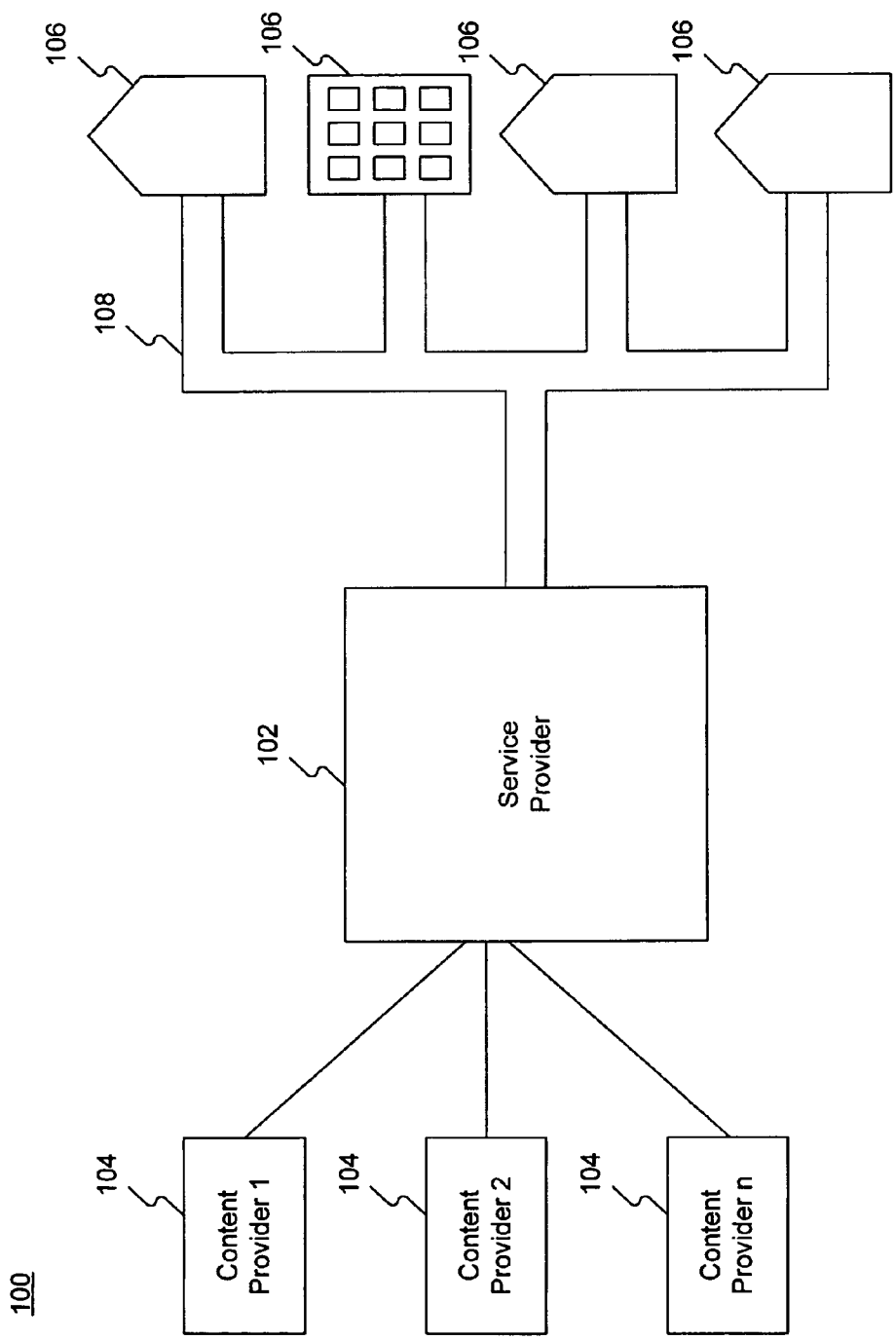
FIG. 1 is a block diagram of a system consistent with an embodiment of the present invention.

FIG. 1 is a block diagram of a system 100 consistent with a preferred embodiment of the present invention. A service provider 102 collects content (e.g., broadcast video, broadcast audio, audio/video on demand, data content), from a plurality of content providers 104. Such content may include, for example, programming from local broadcast television channels, programming from national broadcast television content providers such as Home Box Office or ESPN, and educational programming such as distance learning broadcasts. Service provider 102 transmits data, including the audio/video content, to subscribers 106 via an access network 108. Subscribers 106 may include homes, businesses, hotels, etc. In a preferred embodiment, access network 108 consists mainly of fiber optic cables and connectors, enabling high speed, two-way communication between service provider 102 and subscribers 106. Access network 108 may also include other networking technologies, such as wireless networking. In one embodiment, service provider 102 and subscribers 106 may also be able to communicate via alternate networks that may interconnect the service provider 102 and subscribers 106, such as the Internet (not shown).

Figure 2:
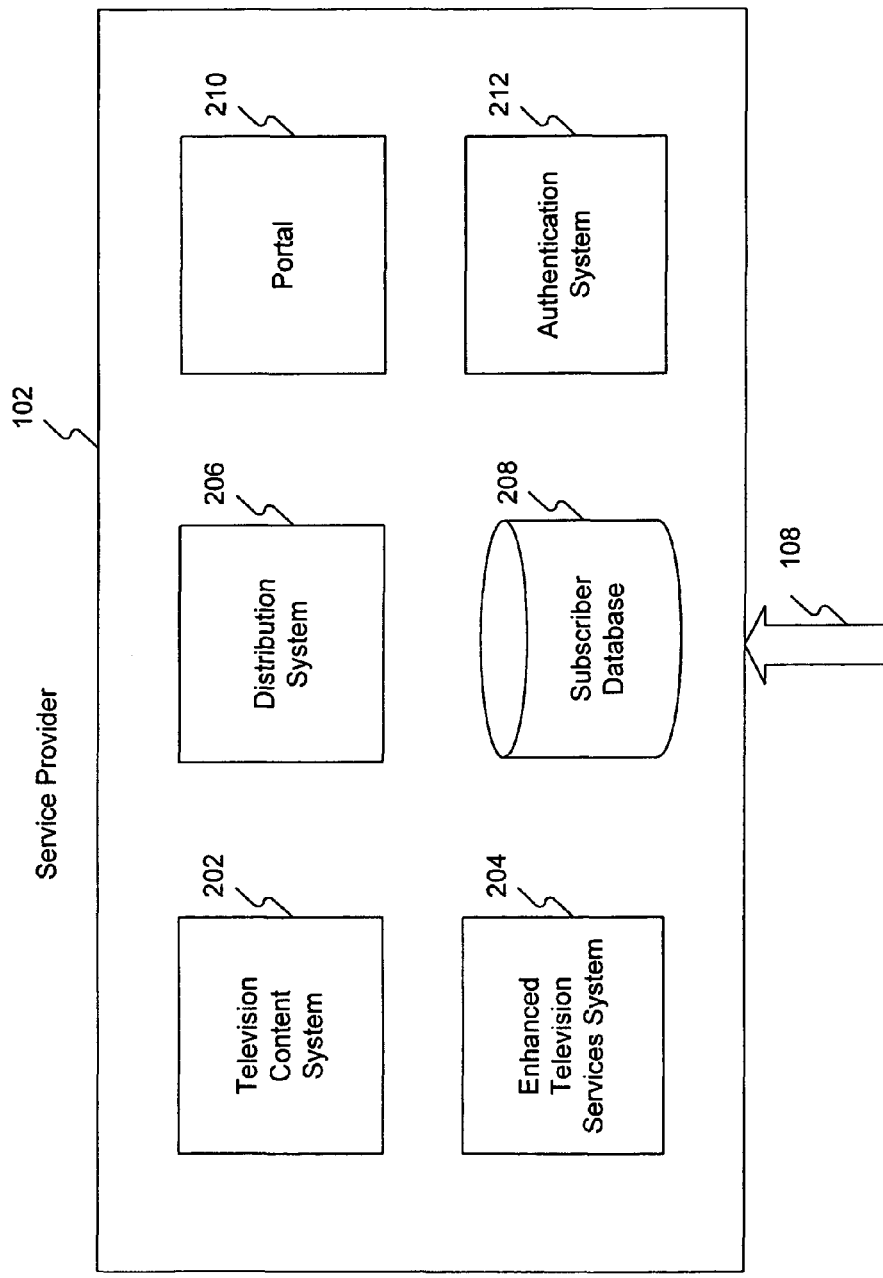
FIG. 2 is a detailed block diagram of a service provider consistent with an embodiment of the present invention.

FIG. 2 is a block diagram of a service provider 102 consistent with a preferred embodiment of the present invention. Service provider 102 may provide multiple services to subscribers 106. For example, service provider 102 may establish and maintain subscriber accounts, provide regular broadcast television programming, provide on-demand video content, enable subscriber feedback, etc. Service provider 102 may also enable subscribers 106 to obtain enhanced services, such as described below.

Exemplary service provider 102 may include various systems and facilities to receive, store, process and transmit content for provision to subscribers 106. For example, exemplary service provider 102 may include a television content system 202, an enhanced television services system 204, a distribution system 206, a subscriber database 208, a portal 210, and an authentication system 212. Television content system 202 may receive, store, process and transmit broadcast television content originated by content providers 104. In one embodiment, service provider 102 may also create television content and store and transmit such content using television content system 202. Enhanced television services system 204 may receive, store, process and transmit data to support enhanced television services and provide subscriber interfaces for accessing enhanced television services (as further discussed below).

Distribution system 206 may distribute content and data, e.g., from television content system 202 or enhanced television services system 204, to subscribers 106. Distribution system 206 may perform broadcast/multicast delivery (e.g., to send the same information to many subscribers simultaneously) or unicast delivery (e.g., to send customized content to a single subscriber). Distribution system 206 may also provide an "upstream" communications path from subscribers 106 to, for example, enhanced television services system 204, such that subscribers may send requests and other information related to obtaining customized content, among other things.

Subscriber database 208 may store data about subscribers 106 such as name, address, subscriptions to enhanced services, etc. Portal 210 may provide an interface for communications with service provider 102 via an external network, such as the public switched telephone network (PSTN) or a wide area network such as the Internet. Authentication system 212 may process authentication and/or authorization information to enforce security and privacy for providing services to subscribers 106.

A skilled artisan will recognize that service provider 102 may include more or fewer components than are shown in FIG. 2, and more or combined functionality compared to that illustrated in FIG. 2. For example, a separate database may be provided to store authentication information used by authentication system 212. In another example, service provider 102 may include telecommunications and/or conference bridge facilities to enable subscribers 106 to access audio/video telecommunications and/or teleconference services (e.g., available through enhanced television services). Additionally, the functionality of service provider 102 may be performed by a single system, or by a combination of computers and other equipment, which may be distributed over multiple locations and interconnected by various communications links. The operation of the components of service provider 102 is described in greater detail below with reference to FIGS. 5-16.

FIGS. 3(a) and 3(b) illustrate block diagrams of a subscriber 106 consistent with a preferred embodiment of the present invention. As shown in FIG. 3(a), subscriber 106 receives transmissions from service provider 102 via access network 108 at a network terminal 302. As described above, access network 108 may be, for example, a passive optical network (PON). The network terminal 302 may receive the network transmissions from service provider 102 via any number of intermediate components/technologies. For example, an optical-to-electrical conversion component may be interposed between the network terminal 302 and service provider 102 in order to convert optical transmissions to electrical signals (e.g., RF signals, POTS signals, Ethernet signals), as well as other transport components that may be deployed therebetween.

Network terminal 302 processes data received via access network 108 and presents it to output devices 304. As such, network terminal 302 may include processors, storage systems, network interfaces (e.g., to access network 108) and device interfaces, as generally known. Output devices 304 can include any number of components with the capabilities to output audio and/or video, such as video displays, speakers, television sets, etc. Network terminal 302 is also connected to one or more input devices 306, which allow users to provide input data, for example, to control the network terminal 302 or output devices 304, or provide data for upstream transmission over access network 108. Input devices 306 can include devices such as keyboards, pointing devices, remote controllers, touch screens, etc. In certain embodiments, network terminal 302 may be integrated with any or all of the output devices 304, as well as any or all of the input devices 306 (an example of which would be a mobile telephone). In some embodiments, subscriber 106 may also use a separate computing system or telecommunications device such as a telephone (not shown) connected to an external network (e.g., PSTN, Internet, wireless network) to communicate with service provider 102 (e.g., via portal 210).

FIG. 3(b) illustrates a specific embodiment relative to typical television service at a subscriber 106. As shown in FIG. 3(b), the network terminal is a set top box 312 connected to access network 108 (e.g., via various technologies/components) to communicate with service provider 102. Set top box 312 is connected to television 314, which includes facilities to display video and produce audio based on signals provided by set-top box 312. A remote control 316 and other input devices (e.g., pushbuttons) are provided and may be communicatively connected to television 314 and/or set-top box 312 (e.g., wirelessly) to enable a viewer to control television 314 and/or set top box 312, and to provide data which may be transmitted over access network 108 to service provider 102, and/or other subscribers 106.

Subscriber 106 may set up an account with service provider 102 which enables and/or controls the ability to receive enhanced television services. For example, the subscriber account may be used by provider 102 to store subscriber identification information, such as a name and address, store indications of which services a subscriber is authorized to receive, such as premium broadcast channels or Internet access, and track and bill for enhanced services, such as viewing of personalized content, etc. The account may also store an identifier of the subscriber's network terminal 302 that allows for identification of the network terminal over the access network 108 (e.g., a unique identifier of a set top box 312 assigned to the subscriber), facilitating the delivery of enhanced television services to the subscriber. Subscriber 106 may access account information, for example, using portal 210 via voice communications (e.g., an interactive voice response system) or data communications (e.g., an interactive web interface over the Internet). Alternatively, a subscriber may use a phone integrated into set top box 312 or controls available in remote control 316 to communicate with service provider 102 over access network 108.

Subscriber 106 may include several users and their equipment. For example, within a single household, different family members may desire to receive different content or subscribe to different enhanced television services from service provider 102. In one embodiment, a subscriber 106 (e.g., a household) may establish an account with service provider 102 and each user (e.g., family members in the household) is associated with that account and may have information stored in subscriber database 208. In another embodiment, each user may establish his own account with service provider 102.

FIG. 4 is a detailed block diagram of a preferred network terminal 302 (such as set top box 312). Network terminal 302 may include an access network interface 402, control system 408, storage system 410 and device interface 412. Control system 408 may include processors or other control logic, which may be used to execute various instructions and manipulate data stored in storage system 410. Storage system 410 may include various storage devices and controllers, such as semiconductor memories (e.g. RAM, ROM, flash), magnetic memories (e.g., disk), optical memories (e.g., DVDs), memory controllers and/or other storage, as is well known. Device interfaces 412 may include various components to interface with external components, such as output devices 304 and input devices 306, as generally known.

Using the access network interface 402, network terminal 302 communicates with service provider 102 to send and receive high-speed communications for television programming, enhanced television services, subscriber account management, etc., over access network 108. Access network interface 402 may include various components to allow for communications over access network 108 in one or more forms, depending on the implementation. For example, access network interface 108 may include an RF interface to receive RF signals and/or an optical interface to receive optical signals. Access network interface 402 may further include components to distinguish between and process various communications carried over access network 108. For example, access network interface 402 may include components to receive broadcast-television-formatted transmissions (e.g., NTSC, MPEG) and/or packet-data-formatted transmissions (e.g., Ethernet, IP). In some embodiments, access network interface 402 may also be connected to device interface 412, for example, to provide broadcast television transmissions to output devices 304.

Storage system 410 may include various modules executable by the control system 408 and implementing various features in preferred embodiments. For example, storage system 410 stores a user interface 404 comprising one or more displays (e.g., an interactive program guide) which may be provided on output devices 304 to enable subscriber 106 to communicate with network terminal 302, select content for viewing, access enhanced viewing features, etc. User interface 404 may include various user interfaces to utilize enhanced television services available through service provider 102, for example, downloaded from service provider 102. Subscriber data 406 may also be stored in storage system 410 to support enhanced television services. For example, a subscriber's viewing preferences or settings may be stored as subscriber data 406. In another example, subscriber data 406 may be stored outside network terminal 302, such as at service provider 102 (e.g., in subscriber database 208) or on a computing system or other device controlled by the subscriber (e.g., a smart card).

Network terminal 302 may include fewer or more components than are shown in FIG. 4, as is well known, and may be interconnected in various ways using buses, etc., as is well known.

B. Enhanced Television Services

A preferred embodiment uses a high-bandwidth bi-directional access network 108 to provide enhanced television services. For example, a service provider may provide a multitude of enhanced services to a subscriber by allowing the subscriber to connect with the service provider via such a high-bandwidth bi-directional access network to obtain, configure and control the delivery of desired content and services. A preferred embodiment utilizes a fiber optic access network, although other high-bandwidth technologies could also be used (e.g., RF wireless, RF over coaxial cables). Fiber optic connections provide much more bandwidth for transmitting data than conventional connections using radio waves or coaxial cable. Fiber, for example, can easily carry hundreds or even thousands of channels of television content, telephone services, and data services (e.g., Internet access). To leverage the additional bandwidth and quality of fiber connections, service providers may offer a wide range of enhanced television services to attract and retain subscribers.

Enhanced television services may include, for example, personalized television channels, synchronized sharing of personal content among subscribers, direct access to supplemental television content, integrated chat and presence information on television, and interactive entertainment. Subscribers may enjoy these services from their premises using familiar devices (e.g., a set-top box, a television, a remote control, etc.). In some embodiments, subscribers may have the option of using a computer or other device connected to the Internet to further customize or enhance television services.

C. Fantasy League TV Service

One enhanced television service implemented according to a preferred embodiment is "Fantasy League" service. This service enables a subscriber to participate in fantasy league competitions with other subscribers of the service, and also, in one embodiment, to view broadcasts simultaneously with fantasy league data on one or more televisions. A subscriber is able to perform actions consistent with roles including, for example, "league administrator" and "team manager," within the context of the fantasy league service. For example, a league administrator may establish a league by setting league-related data including, for example, league name, league type (e.g., sports, politics, box office films), and the desired number of additional league members. As a team manager, the subscriber may participate in the fantasy league by controlling "teams" consisting of "players" selected from fields including, for example, professional sports, politics, and box office films. It is to be noted that the term "player" is not limited to humans. A player may be any element possessing some aspect of quantifiable performance criteria. For example, a fantasy film team may consist of players "Batman Begins," "Star Wars: Revenge of the Sith," and "Mr. and Mrs. Smith" (movies). Performance of a team within the league may be calculated based on agreed-upon performance criteria of a team's players, calculated at an agreed-upon interval, such as the conclusion of real activities (e.g., a football game, political debate, or weekend of film releases) or the end of a specified activity time period. For example, a fantasy film team may generate points based on the number of tickets purchased worldwide for each movie during a particular time period. These results may then be compared to the results for another team, calculated in the same way, to determine the winner of a fantasy league game.

A fantasy league game is generally a competition formed by pairing at least two teams from within a league. A winner of such a game is generally determined by calculating total points generated by each team at the close of the specified activity time period. By using a high-bandwidth bi-directional access network and network terminals such as described in the preferred embodiments, subscribers can enjoy watching and/or recording broadcasts including, for example, sporting events, political debates, and film awards, while simultaneously monitoring and/or recording related fantasy league performance information displayed on the same display, a service that is not possible or practical in conventional television systems.

In one example, a service subscriber logs into a service provider and is authenticated as having access to a fantasy league service. The service provider enables the authenticated subscriber to create a fantasy league of a type determined by the subscriber. The subscriber may then invite and accept new members into the fantasy league and allow the new league members to create teams within the league. Once fantasy league teams have been created, team players may be added or removed by methods including, for example, a league draft, trading with other members in the league, and player purchases. Prior to the occurrence of a real activity or activities relevant to the league (e.g., sporting event, political debate, film awards), a team manager may perform tasks including, for example, activating or deactivating team players for the upcoming real activity, trading with other members of the league, or configuring the service to provide helpful information via a league information system.

During one or more real activities, a team manager may monitor the real activities or other broadcasts, while simultaneously performing tasks including, for example, viewing the upcoming fantasy league competition schedule, displaying real-time or historical league data, and configuring a broadcast recording schedule on the television. Following the real activities, a team manager is able to review relevant league materials including, for example, player highlights, statistical information, previously recorded real activities, and current and cumulative league statistics. Review may be accomplished on the television while simultaneously configuring a team for the next activity time period.

FIGS. 5-16 illustrate an exemplary implementation of a fantasy league service consistent with a preferred embodiment of the present invention. This exemplary implementation is in the context of a fiber optic access network 108 connected to a network terminal 302, which is implemented as a set-top box 312 and connected to a television 314 and remote control 316. Other operating environments are possible, as noted above.

FIG. 5 is a flowchart depicting one implementation of a method for providing fantasy league services consistent with a preferred embodiment of the invention. A subscriber may log in to service provider 102 (step 502) and be authenticated as a subscriber with access to fantasy league services. In one embodiment, authentication of the subscriber may be performed by service provider 102. In another embodiment, authentication may be required by entities including, for example, a third-party provider of fantasy league services and/or a third-party security provider. In one embodiment, the subscriber may already have an existing account with service provider 102 and may receive television content via set top box 312 and television 314. In this example, the subscriber may login to service provider 102 by submitting a username and password to access the account with service provider 102. Alternatively, the set top box 312 may send identification information to the service provider (e.g., on initial network access), and the service provider may determine that the set top box 312 is associated with the subscriber and that access is authorized.

Once authenticated, the subscriber may access functionality associated with fantasy league services. FIG. 15 shows one example of an interface that may be used for accessing the functionality available within fantasy league services, and FIG. 11 shows another example of an interface that may be used to access fantasy league features. The interfaces may be provided by service provider 102 over access network 108 to set top box 312 for display. For example, the interfaces may be downloaded to set-top box 312 upon initialization of the set top box 312, or upon request by the subscriber for the fantasy league service, and possibly stored on set-top box 312 for future requests.

Upon accessing functionality associated with fantasy league services, a subscriber may create a fantasy league by sending such a request to service provider 102 (step 504). In addition to a request to create a league, a subscriber may submit league-related data which may include, for example, a league name, a league type (e.g., sports, politics, box office films), and a desired number of additional league members. The subscriber may then assume the role of league administrator of the newly created league. As a league administrator, a subscriber may access additional functionality for administering the league. This functionality may include, for example, sending invitations to potential league members, approving new league teams, settling intra-league disputes, and changing league-related data. Fantasy league creation is discussed in greater detail below with reference to FIG. 6.

Following the creation of a fantasy league, the league administrator or new league members may create one or more league teams (step 506). A league member becomes a team manager upon successful creation of a fantasy league team. Formation of a team allows a team manager to perform additional functions including, for example, populating the team with players, trading players, and configuring the team for upcoming real activities.

During a real activity, players generate "points" for the team based on the player's performance in a real activity relative to the selected performance criteria. A real activity may include, for example, an NFL football game, a political debate, the announcement of box office revenues, and the issuance of an opinion from the Supreme Court. Performance criteria may include, for example, the number of yards gained by an NFL running back during a football game, the number of issues debated successfully by a political candidate, the amount of money earned by a box office film during the activity time period, and the vote of a Supreme Court justice on a particular opinion. In one embodiment, a team's performance criteria for any specified time period may be used for calculating a team manager's performance relative to other fantasy league team managers and for determining the winner in a fantasy game pairing. For example, on Monday morning the weekend box office numbers are released and "Film A" has earned $12 million, while "Film B" has earned $25 million. In a weekly activity time period, with one team consisting of only one player, "Film A," and another team consisting of only one player, "Film B," the team manager whose team consists of player "Film B" would win the current fantasy game competition.

A team manager may populate a team with players by participating in events including a league draft (e.g., an initial team population real activity wherein all team managers collectively and recursively select players from the available pool of potential players, until each team is populated or the pool is depleted), league trades, player purchases, and mid-season pickups (a team manager may select a player that is not already a member of another team during the season, but after the league draft has been completed). Once a player has been added to a team, the player may become a part of that team's roster and may be activated for competition, traded to another team, deleted from the team, etc., at the discretion of the team manager. As noted above, the term "player" is not limited to humans and may include, for example, professional athletes, box office movies, and motor vehicles (e.g., Ford model stock cars). Team creation within a fantasy league and populating a team with players are discussed in greater detail below with reference to FIG. 7.

Following the creation and population of league teams, a team manager may be able to modify and manipulate team players for a pending fantasy league competition or for general team management (step 508). In one embodiment, a team manager may wish to specify that a particular player should be active during the upcoming activity time period. The team manager may select that player using the remote control 316, set top box 312, and television 314, and set the selected player's status to active for the pending activity time period. In addition, a team manager may wish to initiate a trade with another team manager within the league. A trade may include, for example, notifying another team manager within the league of an interest in acquiring a player on that team manager's team, negotiating trade terms, and exchanging players. Using remote control 316, set top box 312, and television 314, the team manager may initiate such a trade with another team manager within the league while monitoring television broadcasts. Modification of team characteristics, trades, and options are discussed in greater detail below with reference to FIG. 8.

Once a team has been configured for the pending activity time period, a team manager may wish to monitor the performance of the team players during one or more real activities. In one embodiment, a team manager may configure the fantasy league system such that all real activities or other broadcasts currently in progress may be monitored on television 314 while simultaneously displaying real-time team statistics on the same television 314 (step 510). For example, FIG. 12 depicts how one such configuration may appear while a real activity or other broadcast is in progress and available for viewing. A team manager may configure the monitoring system to reflect a configuration most desirable to the team manager at any given time. Alternative configurations may include, for example, splitting the television screen into multiple viewing areas, utilizing translucent statistic displays, scrolling an informational marquee across the screen, and selectively setting an audio feed indicator such that monitoring of a single audio feed from a selected broadcast is accomplished.

A team manager may also be able to configure the fantasy league system to record one or more real activities which involve players on the team manager's team (step 512). This feature may allow a team manager to view one or more activities at a later time after the performance criteria for the players participating during the activity time period have been evaluated. In addition to configuring the fantasy league system to record the real activities, a team manager may also elect to record the real-time statistics as they appear during the recording of activities. In so doing, a team manager unable to watch the real activities as they occur, may watch the recording at a later time with the excitement and suspense that accompanies real-time viewing. Configuration of the fantasy league monitoring and recording system is discussed in greater detail below with reference to FIG. 9.

Following the conclusion of the activity time period, a team manager may wish to view certain statistics associated with the team manager's team. For example, the team manager may want to review the total number of points scored by a particular player on the team while also reviewing the player actions that led to the scoring of those points. A team manager may also view league-wide statistics and actions from other league players which occurred during the activity time period. Recorded material, highlights, league standings, etc., may be viewed following the conclusion of the activity time period. A team manager may use set-top box 312, television 314 and remote control 316 for selecting post-competition material to view (step 512). Viewing of post-competition material is discussed in greater detail below with reference to FIG. 10.

FIG. 16 illustrates an exemplary implementation of the fantasy league service. In a preferred embodiment, the fantasy league service is implemented in enhanced television services system 204. In other embodiments, the fantasy league service may be implemented in other environments (e.g., a third party service provider) which may be accessible through service provider 102. Enhanced television services system 204 may include facilities configured to implement various features of the system, for example, a control system 1602, a league data store 1604, a user interface facility 1606 and a network interface 1608. Control system 1602 may execute the methods and processes used to implement the features of the fantasy league service as described herein, and may be implemented in one or more of software, hardware and firmware, using known processing systems, storage systems and interfacing systems, as is generally known. League data store 1604 provides a storage location for league-related data, such as league names, teams, players, scoring, statistics, etc., and may be accessible by control system 1602. League data store 1604 may be within system 204 (e.g., within control system 1602), or may be external to system 204 but accessible by system 204 (e.g., via network interface 1608).

User interface facility 1606 provides one or more user interfaces to permit a league user to configure, control and view league information. User interfaces may be implemented using known technologies, such as HTML or Java, and may be implemented as one or more modules that may be (completely or partially) downloaded to a subscriber's network terminal. Network interface 1608 provides an interface between enhanced television services system 204 and other components available via service provider 102. For example, a network interface 1608 may include an interface to distribution system 206 to permit the receipt/transmission of league information and controls (e.g., user interfaces, subscriber commands/messages, scoring displays) over access network 108. Network interface 1608 may include interfaces to subscriber database 208 allowing for the retrieval of subscriber information stored therein, authentication system 212 allowing for authorization and authentication operations, and content providers 104 allowing for communication of fantasy data (e.g., statistics). Other interfaces may also be supported as desired (e.g., to portal 210 and television content system 202).

System 204 may be implemented using more or fewer components that illustrated in FIG. 16. For example, various components may be combined into single hardware and/or software implementations, or may be distributed over multiple interconnected hardware and/or software implementations. Such implementations choices are well known.

FIG. 6 is a flowchart demonstrating an exemplary method for enabling the creation, modification, and administration of a fantasy league. A league administrator sends a request to service provider 102 to create a new fantasy league (step 602). The request may be made through a user interface such as shown in FIG. 11. As with other requests described herein, the request may be routed over access network 108 to enhanced television services system 204, where it is received and processed by control facilities 1602. In the preferred embodiment, the request takes the form of one or more data packets transmitted from set top box 312 over access network 108 to service provider 102, formatted appropriately for the networking technology in use (e.g., ATM, Ethernet, IP). In response, the system 204 may download appropriate interface software to the set top box 312 in order to facilitate use of fantasy league service, such as user interfaces from user interface facility 1606, or (if such software is already present at set top box 312 or not needed) provide a response message indicating that the request has been accepted, containing requested data and/or instructing the set top box 312 to display a particular interface.

During the creation of the fantasy league, the league administrator may supply league-related data including, for example, league name, league type (e.g., sports, politics, box office films), and number of additional league members. The league administrator may supply such related data via a user interface displayed on television 314 and remote control 316. Alternatively, in some embodiments, the league-administrator may be able to provide this related data at a later time via a computer connected to the Internet (e.g., via portal 210), after the request for creating a league has been processed by service provider 102.

Once the fantasy league has been created, the league administrator may search for other subscribers of fantasy league services who may be interested in joining the new fantasy league (step 604). In one embodiment, a league administrator may locate subscribers interested in joining the league through a user interface that allows the searching of a list of parties interested in the type of league created by the league administrator. For example, a list of fantasy football fans may be provided to the league administrator (e.g., generated based on information in subscriber database 208) in a user interface which can be searched for subscribers who are not currently in another fantasy football league. In another embodiment, the league administrator may contact friends or relatives known to be interested in participating in a league created by the league administrator. For example, the league administrator may use an address book feature provided by service provider 102, which maintains a list of family and friends the league administrator has compiled. The ability to search for subscribers interested in joining a particular league or invite only family and friends reduces unwanted invitations by enabling the league administrator to specifically target only the subscribers most likely to be interested in joining the fantasy league.

After locating an interested subscriber, the league administrator may issue the subscriber an invitation to participate in the fantasy league (step 606). This may be accomplished, for example, by sending a message from set-top box 312 to control system 1602 including an identifier associated with the potential league participant. Control system 1602 may then generate an invitation message and transmit this invitation message to the set-top box 312 associated with the potential league participant ("invitee"). In one embodiment, the invitation may be displayed directly on the invitee's television 314 allowing the invitee to respond immediately using his remote control 316 and set top box 312. FIG. 13 shows one example of how such an invitation might appear on an invitee's television 314. Alternatively, the invitation may be sent via e-mail, phone line, or other communication method allowing the invitee additional time to review and/or respond to the invitation (for example, using the facilities of portal 210).

The league administrator may also be able to set a time by which an invitee must respond in order to be added to the league. Should the invitee fail to respond to the invitation within the set period of time, or should the league reach a predetermined maximum number of members before invitee responds, the invitation may be rescinded. A league administrator may also issue an invitation with no time limit which may allow the invitee to accept at any time.

Once an invitee has accepted an invitation to join the fantasy league, the invitee may be added to the league (step 608). In one embodiment, the league administrator may manually add the invitee after reviewing the invitee's acceptance. Alternatively, the league administrator may configure the fantasy league service such that an invitee is added as a league member automatically following the acceptance of the invitation. The service may also be configured to stop accepting league members once the league has reached a predetermined number of league members. A subscriber who is accepted to the league becomes a league member and may then perform actions within the system including, for example, creating one or more league teams, sending league messages, and performing pre-draft research. League member information may be stored in league data store 1604 along with other league-related data. League member information may include an identifier associated with the league member which allows for association with resources/data allocated to the member (e.g., set-top box identifiers, authorization information, personal information).

Once the fantasy league and its members have been established, the league administrator may schedule a date and time to hold a league draft, during which team managers may populate their teams with players from the related field (step 610). In one embodiment, a draft may be scheduled by the service provider 102 in the form of a mandatory date and time for the draft. In another embodiment, the league administrator may schedule a draft for any time period desired. Such flexibility allows the league members to coordinate a date and time when all league members are available to participate in the draft.

FIG. 7 is a flowchart of a preferred method for creating, populating, and modifying a fantasy league team. First, a league member creates a new team within the league (step 702). In one embodiment, creation of a league team may be performed through interfaces presented using set top box 312, television 314, and remote control 316. For example, control system 1602 may cause user interface facility 1606 to provide one or more user interfaces to set-top box 312, which may then be displayed to solicit the desired team information. Alternatively, team creation may be performed via a computer connected to the Internet, which may be in communication with the enhanced television services system 204 via portal 210. In order to create a team, a league member may specify team-related data including, for example, team name, team colors, and team logo. This specified data may be used by the league administrator and/or the service provider to determine the acceptability of the team for the fantasy league. Such team information may be received by set-top box 312 in a format specified by, for example, the presented user interfaces, transmitted from set-top 312 to system 204 in one or more messages containing such team information, and stored in league data store 1604 with other league-related data, for example, in association with the league member identification.

A league administrator may determine that a newly created team is not acceptable for the current fantasy league and delete the newly created team (step 704). In making such a determination the league administrator may consider criteria including, for example, the team-related data provided at the time the team was created and the current standing of the league member responsible for creating the team. In addition, service provider 102 may also determine that a team is unsuitable for membership in the league based on terms of service or other criteria specified by service provider 102. In such a case, the service provider may elect to delete the newly created team from the league. One skilled in the art will recognize that there may be other situations where it would be desirable to delete a team from the fantasy league (step 704). These situations may include, for example, where a team manager has failed to perform necessary league duties and where the team manager has requested to leave the league.

Following the creation of a team by a league member, the league administrator may be required to approve the creation of the new team within the league (step 706). The league administrator may configure the approval of new league teams to be handled by service provider 102 requiring no input from the league administrator. In such a situation, control system 1602 may use predefined rules for screening data specified during creation of the team. Alternatively, the league administrator may handle the screening and approval process manually by reviewing the team-related data for each newly-created team. The league administrator may then screen each new team based on rules defined by the league administrator or rules agreed upon by league members. For example, where the league members have decided that no team shall be named "X," a team named "X" may not be approved by the league administrator for participation in the fantasy league.

Once a team has been approved within the league, notification may be provided to the league member responsible for creation of the team (also referred to as the team's "owner" or "manager"), and the team owner may then perform tasks consistent with that role. One example of such a task is pre-draft research (step 708). Pre-draft research may allow a team manager to, among other things, evaluate potential players for the team manager's team in advance of the scheduled league draft. The team manager may review statistics and/or coverage of potential players on the television 314, for example, via a user interface provided by set top box 312 (step 710). The statistics and coverage may include, for example, the number of yards a professional football running back rushed the previous season, a particular politician's approval ratings, and film previews. While reviewing such data, if a team manager determines that a potential player may be a good match for the team manager's team, the team manager may add the player to a list of desired players (step 712). A team manager may use remote control 316, set-top box 312, and television 314 in order to make such a selection. Alternatively, a team manager may use a PC connected to the Internet to make a selection. Selections may be transmitted to system 204 and stored in league data store 1604 with other league-related data, for example, in association with the team information. Alternatively, selections may be stored locally at set top box 312 in subscriber data 406.

After the pre-draft research has been completed, the league administrator may hold the league draft event (step 714). In one embodiment, the league draft may be performed with all team managers present at a single location. For example, the league administrator may hold a "draft party." All team managers may access a predetermined location and each team manager, repeatedly in turn, may select one or more players from the available pool of players in the related league. Team managers continue to select players until all teams are populated or the available pool of players is exhausted. For example, in a fantasy football league, the related league may be all "AAA" collegiate football teams. In this example, the team managers would each take a turn and select a player currently playing football on an "AAA" college football team. In a "draft party" setting, coordination of selections may be handled manually by the team managers and league administrator.

Alternatively, the draft may be conducted with all team managers at different locations. For example, each team manager may connect to the service provider 102 from home using a television 314 and set top box 312. Team managers may also connect to the service provider via a PC connected to the Internet via portal 210. Each team manager, repeatedly in turn, may then select one or more players from the available pool of players in the related league. Where all team managers cannot be present in the same location for the draft, player selection may be handled by service provider 102, using user interfaces provided for that purpose. Additionally, team managers may use the audio and/or video portions of a conference bridge facility of service provider 102 (if available) during the league draft to maintain contact with other team managers, creating a "draft party" environment even when the team managers cannot be together in one location. Using the conference functionality may enable the team managers to coordinate player selection manually. User interfaces for facilitating the drafting process may be supplied by the control system 1602 from user interface facility 1606 to set-top box 312 (or a computer connected via the Internet). Player information associated with players selected during the drafting process (e.g., name, team, league, position) may be stored in league data store 1604 with other league-related data, for example, in association with the team information of the team which selected the player.

FIG. 8 is a flowchart demonstrating an exemplary method for processing requests related to team modifications. A team manager may require the ability to modify a team throughout the fantasy league season (step 802). Situations where a team manager may require such functionality may include, for example, a desire to trade a player, a need to add or remove players from the roster, and general pre-competition team configuration (e.g., setting particular players as active participants in the upcoming real activity). In one embodiment, a team manager may access the team modification functionality via the television 314 using the buttons on remote control 316 to manipulate user interface menus supplied by system 204 and displayed via set top box 312. FIG. 14 shows one arrangement of remote control buttons that a team manager may use to access team services. Messages containing requests to make changes to team information such as configurations and player rosters may be transmitted from set-top box 312 to system 204 in response to user inputs and in accordance with the particular user interfaces presented.

Using remote control 316, set top box 312, and television 314 to access television based interfaces for modifying a fantasy league team allows the team manager to work through changes to a team, while also watching television broadcasts on the same television 314. For example, a team manager in charge of a fantasy football team may watch pre-game television broadcasts which discuss up-to-date information including athlete injury reports, athlete performance, and current weather conditions at the game location. While watching the pre-game broadcasts, a team manager may learn that his team quarterback was injured the day before and will not be participating in the game. The team manager may immediately access the team modification interfaces, deactivate the injured quarterback and activate the team's backup quarterback for the pending game, all from a single interface (i.e., remote control 316) and from the comfort of his game day seat. By enabling a team manager to monitor such programming while making changes to his team, the team manager may be assured that he has the most current information and may therefore make the most effective modifications to his team.

Once a team manager has accessed the team modification interfaces, the team manager may wish to initiate a player trade with a targeted team manager (e.g., a team manager possessing a desired player). The team manager may initiate such a request via remote control 316, set top box 312, and television 314, for example, as facilitated by a user interface provided to television 314 soliciting the team manager to provide information related to the request including, for example, the player to be traded, the proposed terms of the trade (e.g., trade for what other team player, additional money, timeframe for the trade), and a message to be sent to the targeted team manager. The set-top box 312 of the team manager may then transmit the trade request message to the system 204 (step 804).

Upon receiving the trade request, system 204 may cause a notification to be generated and sent out to the target team manager as well as other league members (step 806). The notification may notify the target team manager that another team manager is interested in trading players, and to notify other league members of the terms of the trade for evaluation. In one embodiment, the notifications may be sent over the network to be displayed on the recipients' televisions 314. In this example, the target team manager and other league members may review the terms of the trade and respond using remote control 316, set top box 312, and television 314. Alternatively, the notification may be sent out via e-mail to the address of each league member (e.g., stored as part of the member's subscriber information 208).

In various embodiments, a league member may have the ability to select whether to receive trade notifications displayed on the television 314. Further, set top box 312 may be configured to send the trade request directly to the target team manager, rather than through system 204, for example, where the team manager is aware of an address for the set top box of the target team manager.

After notification of the trade request has been distributed to the target team manager (and possibly other league members), the target team manager may decide whether or not to accept the terms of the trade by submitting such a selection to service provider 102 (step 808). During the decision making process, the target team manager may discuss the terms of the trade with the trade requester or other league members using audio and/or video conference bridge functionality provided by service provider 102. The target team manager may also discuss the terms of the trade using the messaging functionality provided by service provider 102 and discussed in greater detail below with reference to FIG. 9.

The target team manager may communicate a decision regarding the trade request using remote control 316, television 314, and set top box 312 to transmit a message over access network 108 to system 204. Alternatively, the target team manager may use e-mail, a phone line, or other communication method to communicate the decision to the trade requester, league administrator, and the other league members. Where the target team manager has decided not to accept the trade, the service provider may cancel any changes to related team rosters in addition to the previously pending trade.

Should the target team manager accept the terms of the trade, the league members may approve or reject the trade by individually, or as a group, signaling a decision to service provider 102 (step 810). The league members may also discuss the trade terms in real-time using audio and or video conference bridge functionality provided by service provider 102, or the league members may use messaging functionality discussed in greater detail below with reference to FIG. 9. In one embodiment, should the other league members determine the trade terms to be unfair, or that the trade is generally not compatible with league standards, the league members may signal a decision to reject the proposed trade. In such a case, the trade and any pending roster changes may be cancelled. Where the league members determine the trade is acceptable, the league members may signal their approval of the trade.

In one embodiment, the league members may submit their decisions regarding the trade via the remote control 316, television 314, and set top box 312 of each league member. For example, the league members may signal their decision immediately using remote control 316 to select from options presented on the trade notification displayed on television 314, and set top box 312 may send a message to system 204 over access network 108 indicating the member's selection. Alternatively, the league members may submit their decision to the league administrator via e-mail, phone line, or other communication method.

Where both the target team manager (and possibly the other league members) approve of the trade, system 204 may cause the trade to be finalized and the related rosters and team information to be updated according to the trade information (step 812). System 204 may perform actions following a final approval of a trade including, for example, transferring one or more players from the trade requester's team to the target team manager's team, transferring one or more players from the target team manager's team to the trade requester's team, transferring funds from the trade requester's account to the target team manager's account, and transferring funds from the target team manager's account to the trade requester's account. This may be accomplished by modifying the team information and/or player information stored in league data store 1604 to reflect the results of the transaction.

A team manager may also add or remove players from a team (step 814). For example, a team manager may be faced with a situation in which a particular player on the team roster has been rendered unable to compete. In such a situation, the team manager may remove such a player from the team roster. The team manager may then add an additional player through methods including, for example, a two-for-one trade with another team in the league, a selection of a previously unchosen (e.g., not drafted) player, and a player purchase where the team manager must relinquish funds in order to purchase a "free-agent" for the team. A free-agent may be a player on another team within the league that has been made available for purchase by the manager of that team. The team manager may wish to use the research functionality also available for pre-draft research (step 708) or the team manager may have previously determined which player should be added to the team. A user interface may be provided from system 204 to set top box 312 which displays current players associated with the team and/or players available for addition to the team. The user interface may also permit the team manager to make a selection for adding or deleting players using remote control 316, set top box 312, and television 314 to select particular players, which selection may then be sent as one or more messages from set top box 312 over access network 108 to system 204 for processing. A team manager's selection may also be made using a PC connected to the internet, a phone line, or other communication method.

Prior to activity which counts toward league scoring, a team manager may wish to designate a particular lineup of players as "active" for the pending activity. Generally, a team manager may have only a pre-selected maximum number of players active during an activity which counts toward league scoring, and only active players generate points for the team. For example, a fantasy football team may be permitted to have one quarterback and two receivers active during an activity time period. If a particular team manager possesses three quarterbacks on the team roster, that team manager may be required to activate one quarterback while also deactivating the two remaining quarterbacks. Only actions by the active quarterback will generate points for the team. Therefore, system 204 may provide an interface to set top box 312 that allows the team manager to select certain players as active (step 816) or inactive (step 818) as determined by the team manager prior to activity. The team manager may use remote control 316, set top box 312, and television 314 for selecting active and inactive players. Further, the team manager may make selections for activation/deactivation of players while monitoring television broadcasts. One or more messages may then be sent to system 204 containing indications of the active/inactive selections, allowing control system 1602 to modify team information and/or player information in league data store 1604 accordingly.

The team manager may configure a service provided by service provider 102, such that information relevant to players on the team manager's roster are sent to the team manager (step 820). This information may include, for example, current conditions surrounding the activity, the current status of team players, and public opinion results. The service may be configured to cause the information to be retrieved by system 204 (for example, from a content provider 104 that provides such information), transmitted from system 204 over access network 108 to set top box 312 and displayed on the team manager's television 314, as an overlay allowing broadcast video content to be viewed concurrently. Alternatively, the service may be configured to notify the team manager by other methods including e-mail, telephone, or pager (as may be specified by the team manager in league data store 1604 and/or subscriber information 208).

FIG. 9 is a flowchart depicting an example of processing performed in the course of monitoring actual activities related to the league, other broadcasts, and league performance data. Service provider 102 may provide one or more transmissions of content that allow subscribers 106 to monitor activities related to the fantasy league. For example, service provider may transmit one or more broadcast transmissions of football games (e.g., on multiple channels) over access network 108 which are receivable by set top boxes 312, where the football games are the basis for the data that is used to determine team performance. Subscriber 106 may use the set top box 312 to display one or more of the activities on television 314, enabling the subscriber to visually and audibly monitor the activities. Service provider 102 may also record various ones of the related activity broadcasts for various purposes, as further discussed below.

During the activity time period, a team manager may monitor real activities—e.g., being shown on a broadcast television channel—on television 314 while simultaneously monitoring league and team related performance data on television 314 (step 908). System 204 may provide to set top box 312 a user interface which permits performance data to be displayed on the television concurrently with, for example, the content being broadcast on the television channel being viewed. This interface may located in a manner such that it does not interfere with the content being viewed (e.g. in a corner of the screen), and/or may be presented in a "translucent" manner, such that content may be "seen through" the interface. Set top box 312 may allow the interface to be manually located by the viewer (e.g., by using controls of remote control 316), during or prior to display thereof.

The user interface may be configured such that performance data is displayed in association with players and/or teams. For example, a list of active players may be displayed in combination with statistical performance data associated with each player, or a total score for one or more teams may be displayed. FIG. 12 illustrates an example of a user interface displaying player performance data. The user interface may also permit the user to select certain players to obtain more detailed performance data. In one embodiment, this more detailed performance data is provided as part of the user interface, but is hidden from view until selected by the user.

In one embodiment, the league-related performance data may be updated immediately as changes occur (i.e., in real time) by messages sent from system 204 to set top box 312. For example, if a player on a fantasy football team scores a touchdown, system 204 would transmit a message to set top box 312, which would then cause the statistical display on the team manager's television 314 to immediately be updated to reflect the league points awarded to the team. Real time data updates may be accomplished by methods including, for example, receiving data from a third-party fantasy league data service (e.g., a content provider 104) at system 204, determining an team and/or player to which the data is applicable, and sending messages to those set top boxes 312 associated with team owners associated with the team/player (based on information stored in league data store 1604). In another embodiment, the league-related performance data may only update at scheduled intervals based on player performance during the previous interval (i.e., delayed schedule). Updates can be provided using either a "push" model (e.g., the system 204 sends the update messages automatically) or a "pull" model (e.g., the set top box requests the update), depending on the implementation.

In some embodiments, the monitoring of real activities— e.g., the viewing of broadcast television content—may be limited to a single activity displayed in combination with the league-related performance data on television 314 as described above. Alternatively, set top box 312 and/or service provider 102 may support the viewing of multiple activities simultaneously in combination with the display of the league performance data. For example, as shown in FIG. 17, the television display may be divided into multiple areas, each displaying a separate television broadcast while maintaining one or more displays of the league-related performance data on television 314. This may be supported via multiple reception capabilities at set top box 312, and/or via multiple transmission capabilities at service provider 102.

As an additional feature, when a team manager's player has performed exceptionally during a real activity, the system 204 may be configured to cause a notification to be sent to the team manager's set top box 312, alerting the team manager to the player's performance (step 904). Such a notice may contain functionality enabling the receiver of the alert to review a replay of the real activities which led to the generation of the alert. For example, when a fantasy football team manager's running back scores a touchdown during a real activity, an alert notifying the team manager of the event may be sent with an option to "view the replay." Upon selecting the "view the replay" option, the team manager's set top box 312 may display a replay of the event which resulted in the touchdown.

The replay content may be transmitted along with the notification, or may be transmitted after receiving a message from the set top box indicating that the user desires to view the replay. The replay content may be viewed, for example, in a user interface window, thereby permitting the currently broadcast content to remain displayed on television 314.

During the course of the activity time period, the service provider may also process actions by the league administrator or other league members including, for example, league invitations and trade requests/notifications (step 906). Processing related to league invitations is discussed in greater detail above with reference to FIG. 6, while processing related to trade requests/notifications is discussed in greater detail above with reference to FIG. 8. User interfaces related to such activities may be displayed in the same minimally intrusive/ translucent manner as the statistical display, thus allowing the subscriber to concurrently view the activity broadcast.

During the course of the real activities, the service provider may enable messages to be sent by one league member to one or more other league members (step 910). The messages may include, for example, taunts sent to other team managers, thoughts on a recent trade notifications, and general discussion. A messaging interface may be displayed by set top box 312 on television 314, allowing the subscriber to enter message data, as well as indicate a recipient subscriber for the message. Upon completion of the message, the message may be sent over access network 108 via service provider 102, which determines the appropriate set to box for delivery of the message. In one example, the messages, once sent, may be displayed immediately on the television 314 of one or more recipients. The recipients may then respond to the message using remote control 316, set top box 312, and television 314. Alternatively, the messages may be stored by service provider 102 or on the recipient's set top box 312, for display at a later time. The messages may also be sent by standard e-mail or other communication method for review and possible response by the intended recipient.

In one embodiment, the service provider may subject messages to filters depending upon the configuration and rules of the service provider, the rules of the fantasy league, and the intended recipient's personal preferences. The filters may prevent messages in violation of the rules and preferences discussed above from being transmitted to one or more recipients. Messages not violating the rules or preferences may then be transmitted to the one or more recipients by the service provider 102.

Service provider 102 may enable a fantasy league member to configure the display of real activities simultaneously with league and team related performance data in a manner consistent with the league member's needs (step 912). A single real activity displayed in combination with the league and team related data may be configured, particularly where the league member has access to only one broadcast out of multiple ongoing real activities. Alternative configurations may include, for example, multiple television broadcasts displayed on a single television screen split into a plurality of viewing areas, one or more solid or translucent statistical displays on a single television, and one of a plurality of statistical displays arranged within each of a plurality of broadcast viewing areas such that each viewing area contains a single statistical display. A user interface may be provided to receive configuration information associated with the aforementioned viewing preferences. Configuration information usable to determine the subscriber's viewing preferences may be stored at set top box 312 (e.g., as subscriber data 406), or may be stored at service provider 102 (e.g., in subscriber database 208).

Service provider 102 may enable a team manager to configure recording of real activities for later viewing (step 914). For example, a team manager may wish to record all real activities for a single player on the team manager's team roster in order to evaluate that player's performance. A user interface may be provided that allows the team manager to view the team roster to find the desired player and make selections such that all upcoming real activities in which the player is scheduled to participate are recorded. Alternatively, a team manager may also find markers in an interactive programming guide of set top box 312 showing scheduled real activities with participating players. Markers indicating team player participation in a particular real activity may be arranged in an interactive programming guide listing such that a team manager may easily locate real activities in which a team player is participating. By using remote control 316 to highlight a particular marker in the interactive programming guide, the team manager may access a display containing information related to the participating player and configure the recording schedule appropriately. A team manager may also configure the recording schedule such that all real activities in which team players are involved are recorded.

Additionally, the team manager may configure the recording system to record the league-related performance data simultaneously with the real activities. When viewed at a later time there may be little or no difference between the live display and the recorded version, thus permitting the subscriber to feel as if the experience were live. For example, a message log of update messages may be recorded in coordination with the video broadcast recording, such that performance data updates may be provided at appropriate times during recording playback. Other synchronization schemes are of course possible, A team manager may also configure recording of the material to be done locally on a recorder integrated within the team manager's set top box 312. Alternatively, service provider 102 may provide for the recording and storage of material to take place within the service provider's system.

Service provider 102 may enable a team manager to configure the fantasy league system to send notifications of information the team manager believes relevant to the fantasy team (step 916). The system 204 may enable notices for information related to real activities including, for example, weather conditions, updates of participating players, and current commentary related to a player. For example, where a particular player on the team manager's team was suddenly injured, the service provider 102, upon determining such an injury has occurred, may cause a notice to be sent over access network 108 directly to the team manager's set top box 312 for display on television 314. Alternatively, system 204 may cause such a notice to be sent via e-mail, phone line, or other communication method.

System 204 may enable the display of a competition schedule for a team manager's team as well as for the entire league (step 918). Viewing of such a schedule may be enabled through a user interface presented on television 314 and selection by using buttons on remote control 316. A team manager may view his team's schedule for a particular activity time period. For example a team manager may wish to see a weekly schedule showing the team manager's competition pairing within the league (i.e., the other league team against which the team manager's team will compete during that time period). Alternatively, a team manager may view his team's pairings with league competitors for an entire fantasy league season. Viewing of such information may be accomplished simultaneously while monitoring real activities or other television broadcasts currently in progress, or during a time when no other broadcasts are displayed. A team manager may use such scheduling information to plan a strategy for the league pairings remaining in the fantasy league season.

FIG. 10 shows one method for processing related to post activity time period actions taken by a league member. A league member may wish to view materials including real activity highlights, league and team related performance data, and commentator reviews following the completion of an activity time period (step 1002).

Service provider 102 may enable a league member to view highlights for players related to the fantasy league (step 1004). Highlights may include such things as extraordinary events executed by a player, mistakes committed by players, point generating events, and other general performances during a real activity. For example, a team manager may wish to see all point-generating events in which players on his team participated. A user interface may allow the team manager to request replays of the aforementioned events, which may be transmitted to system 204. System 204 may then access stored recorded activity content associated with the requested players/events/criteria, and transmit the recorded content to the team manager's set top box 312 for display on the television 314. Alternatively or additionally, system 204 may request such content from a content provider 104, and may forward such content to the subscriber's set top box 312 upon receipt from content provider 104.

Service provider 102 may enable post-competition viewing of league and team related performance data (step 1006). For example, a team manager may access a user interface that displays overall league standings and/or past team performance data. A team manager may configure how the performance data may be displayed and what data should be transmitted. For example, a team manager may wish to view team rankings based on team points scored during a specified activity time period. Additionally, a team manager may view statistics for his team and/or the league as a whole for the entire competition season. Display of such data may include, for example, league standings (i.e., team rankings within the league), individual player performance through the course of the fantasy league season, and accuracy of past player performance predictions. In one embodiment, viewing of the statistics may take place while a league member is also monitoring current or recorded material including, for example, real activities, highlights from real activities, and other broadcasts on the television 314. Display of recorded materials is discussed in greater detail below with reference to step 1008.

Based on the recording configuration selected as discussed above with reference to step 914, system 204 may enable a team manager to review previously recorded broadcasts related to the team manager's team or the entire league. Display of previously recorded materials may take place simultaneously with a display of league and team related performance data. Where a team manager has configured the recording of all real activities, playback may be configured similarly to the configuration of the display as discussed above with reference to step 912. A single real activity or other television broadcast displayed in combination with league and team related performance data may be monitored on the television 314. Alternative configurations may include, for example, multiple real activity or other television broadcasts displayed on a single television screen split into a plurality of viewing areas, one or more semi-translucent statistical displays on a single television, and one of a plurality of statistical displays arranged within each of a plurality of broadcast viewing areas such that each viewing area contains a single statistical display.

The order in which steps and processes consistent with the preferred embodiment described herein is exemplary only. It will be apparent to those skilled in the art that order of performance may not be important and the steps and processes may be performed in an order different than that described.

Other embodiments of the invention will be apparent to those skilled in the art from consideration of the specification and practice of the preferred embodiment disclosed herein. It is intended that the specification and examples be considered as exemplary only, with a true scope and spirit of the invention being indicated by the following claims.

We claim:

1. A system comprising:
a device coupled to a bi-directional access network, where the device is to:
receive, via at least one user interface, a request for fantasy league data,
display, based on the request for fantasy league data and via a plurality of individual display areas, the fantasy league data, a first television broadcast, and a second television broadcast,
where the fantasy league data is displayed in a first one of the plurality of individual display areas, the first television broadcast is displayed in a second one of the plurality of individual display areas, and the second television broadcast is displayed in a third one of the plurality of individual display areas,
where the first television broadcast and the second television broadcast are included in broadcast television content transmitted via the bi-directional access network,
receive, via the at least one user interface, user data,
create, based on the user data, a fantasy league of a particular type,
locate other subscribers identified as being interested in the fantasy league of the particular type, and
send invitations to the located subscribers to join the fantasy league.

2. The system of claim 1, where the device includes:
a memory that stores data associated with teams of the fantasy league; and
a user interface module that provides the at least one user interface.

3. The system of claim 1, where the fantasy league data includes at least one of player performance information for:
one or more players assigned to a team, and
a team status relative to one or more teams associated with the fantasy league.

4. The system of claim 1, further comprising:
an authentication system coupled to the device to receive subscriber security information and determine whether the subscriber is authorized to access the device;
where the subscriber security information includes at least one of a username, a password, or a unique identifier.

5. The system of claim 1, where the device is further to:
receive fantasy league configuration information, the fantasy league configuration information including at least one of a league identifier, a team identifier, a player identifier, a request to create the fantasy league, a request to create a fantasy league team, or a subscriber identifier.

6. The system of claim 1, where the bi-directional access network includes a fiber optic network, and the device is further to:
display, via the first one of the plurality of individual display areas, a portion of the fantasy league data; and
display, via a fourth one of the plurality of individual display areas, a different portion of the fantasy league data,
where the first television broadcast and the second television broadcast are associated with the fantasy league data and comprise all of a plurality of separate television broadcasts that are associated with the fantasy league data and are transmitted to the device at a particular time, and
where the first individual display area, the second individual display area, the third individual display area, and the fourth individual display area each comprise different ones of the plurality of individual display areas.

7. The system of claim 1, where the device includes:
a recorder to record the broadcast television content and the requested fantasy league data in response to the fantasy league data being requested.

8. A system comprising:
an access network interface to communicate over a bi-directional access network and receive at least one transmission containing broadcast television content, the broadcast television content including multiple real activities, where the multiple real activities include a plurality of different sporting events;
a storage system to store at least one user interface;
a device interface to communicate with an output device and transmit the broadcast television content to the output device; and
a control system that is communicatively coupled to the access network interface, the storage system, and the device interface, where the control system is to:
receive a message including fantasy league data,
cause at least one user interface, the message, and the broadcast television content to be simultaneously displayed by the output device to allow a user to view the plurality of different sporting events in combination with the fantasy league data,
present a plurality of viewing configuration options, the plurality of viewing configuration options including at least two of:
a first configuration to provide the message in a window superimposed on a portion of an area displaying at least one of the plurality of different sporting events,
a second configuration to split a display of the output device into a first area displaying the plurality of different sporting events and a second area displaying the message,
a third configuration to display the message as a translucent display,
a fourth configuration to scroll the message across the area displaying at least one of the plurality of different sporting events, and
a fifth configuration to selectively set an audio feed indicator to monitor an audio feed from a selected one of the plurality of different sporting events,
receive a selection of one of the presented plurality of viewing configuration options, and
present the selected viewing configuration options.

9. The system of claim 8, where the control system is further to cause one or more of the plurality of different sporting events, of the broadcast television content, to be recorded in conjunction with the fantasy league data.

10. The system of claim 8, where the fantasy league data includes at least one of player performance information for one or more players assigned to a team or team status relative to one or more teams associated with the fantasy league data, and where the plurality of different sporting events comprise all of the plurality of different sporting events that are associated with the fantasy league data and are currently in progress when the at least one user interface, the message, and the broadcast television content are caused to be simultaneously displayed.

11. The system of claim 8, where the system includes a set-top box, and where the output device includes a television.

12. A method performed by an electronic service provider, the method comprising:
   receiving, by a computing system of the electronic service provider that is in communication with an access network, a request to create a fantasy league, of a particular type from a first user;
   locating, by the computing system, subscribers identified as being interested in the particular type of fantasy league;
   providing, by the computing system, information identifying the located subscribers to the first user;
   receiving, by the computing system, a message comprising fantasy league-related data from the first user to a second user, where the second user is one of the identified subscribers;
   determining, by a subscriber database of the electronic service provider, a network terminal associated with the second user;
   transmitting, by the computing system, the message comprising fantasy league-related data to the network terminal; and
   transmitting, by the computing system, a television broadcast content, including a plurality of different television broadcasts, to the network terminal at substantially the same time as the message comprising fantasy league-related data to display the message together with two or more of the plurality of different television broadcasts.

13. The method of claim 12, where the message includes at least one of an invitation to join the fantasy league, player performance information, or team status relative to one or more teams associated with the fantasy league.

14. The method of claim 12, where the message includes at least one of a league draft event or a request to trade a player.

15. The method of claim 12, further comprising:
   transmitting a user interface to the network terminal; and
   displaying the content of the message at the user interface.

16. The method of claim 12, further comprising:
   recording the plurality of different television broadcasts; and
   determining a content of the message based on the recorded plurality of different television broadcasts.

17. The method of claim 16, further comprising:
   selecting a recording schedule such that the plurality of different television broadcasts is automatically recorded.

18. The method of claim 16 further comprising:
   receiving a request from the network terminal to view the recorded plurality of different television broadcasts and fantasy league-related data; and
   transmitting the recorded plurality of different television broadcasts and fantasy league-related data to the network terminal.

19. The method of claim 12, further comprising:
   receiving security information and causing authentication of the security information.

20. A non-transitory computer-readable medium storing instructions executable by a processor that, when executed by the processor, cause the processor to:
   receive, from a user, a request to create a fantasy football league;
   locate, based on receiving the request, subscribers identified as being interested in fantasy football;
   provide information identifying the located subscribers to the user;
   receive, from the user, a message for one or more of the located subscribers, where the message includes information related to the fantasy football league;
   determine, based on the message, a network terminal associated with each of the one or more of the located subscribers; and
   transmit, to the network terminal associated with each of the one or more of the located subscribers, the message and television broadcast content, where the television broadcast content includes two or more different broadcasts of football games relevant to the information related to the fantasy football league to enable the message and the two or more different broadcasts to be concurrently displayed.

* * * * *